(12) United States Patent
Erdtmann et al.

(10) Patent No.: US 7,296,038 B2
(45) Date of Patent: Nov. 13, 2007

(54) CONTEXT RESOLUTION

(75) Inventors: Martin Erdtmann, Wiesloch (DE);
Joerg Gehring, Obersimten (DE);
Andreas Hirche, Leutershausen (DE);
Wolfgang Otter, Spechbach (DE);
Manfred Peter, Walldorf (DE);
Natalya Timchouk, Sandhausen (DE);
Juergen Stolz, Steinach (DE); Stefan Schilli, Berghaupten (DE)

(73) Assignee: SAP Aktiengesellschaft, Walldorf (DE)

( * ) Notice: Subject to any disclaimer, the term of this patent is extended or adjusted under 35 U.S.C. 154(b) by 477 days.

(21) Appl. No.: 10/815,457

(22) Filed: Apr. 1, 2004

(65) Prior Publication Data
US 2005/0223312 A1  Oct. 6, 2005

(51) Int. Cl.
*G06F 17/30* (2006.01)
(52) U.S. Cl. .................. 707/203; 715/511; 715/515
(58) Field of Classification Search ............... 707/203; 715/511, 515
See application file for complete search history.

(56) References Cited

U.S. PATENT DOCUMENTS

| | | | |
|---|---|---|---|
| 6,134,552 A * | 10/2000 | Fritz et al. ............... | 707/10 |
| 6,263,121 B1 * | 7/2001 | Melen et al. .............. | 382/305 |
| 6,678,705 B1 * | 1/2004 | Berchtold et al. .......... | 707/204 |
| 6,996,817 B2 * | 2/2006 | Birum et al. .............. | 717/170 |
| 2002/0083093 A1 * | 6/2002 | Goodisman et al. ........ | 707/511 |

* cited by examiner

*Primary Examiner*—Cam Y Truong
*Assistant Examiner*—Thu-Nguyet Le
(74) *Attorney, Agent, or Firm*—Fish & Richardson P.C.

(57) ABSTRACT

Methods and apparatus, including computer program products, for maintaining a database, including maintaining a collection of documents containing content, each of the documents including a hyperlink to another document and represented by a unique logical information object (LOIO), each unique LOIO pointing to one or more physical information objects (PHIOs), each of the PHIOs containing a variant of the content of a document, the variant being one of more attributes and determining a suitable PHIO when a LOIO is response to a request.

11 Claims, 33 Drawing Sheets

100

⟶ points to the release predecessor means that B is an extension of A

| E | $V_2$ | $V_1$ | Context chain | Condition |
|---|---|---|---|---|
| (SEM, 3.5) | | | | |
| | (SEM, 3.5) | | | |
| | | (SEM, 3.5) | | |
| | | | (SEM, 3.5) | |
| | | $R_1$ | | $(SEM, 3.5) \in Def(R_1)$ |
| | | (SEM, 3.2) | | |
| | | | (SEM, 3.2) | |
| | | | | $(SEM, 3.2) \notin Def(R_1)$ |
| | $R_2$ | | | $(SEM, 3.5) \in Def(R_2)$ |
| | (BW, 30B) | | | |
| | | (BW, 30B) | | |
| | | | (BW, 30B) | |
| | | $R_1$ | | $(BW, 30B) \in Def(R_1)$ |
| | | (BW, 30A) | | |
| | | | (BW, 30A) | |
| | | | | $(BW, 30A) \notin Def(R_1)$ |
| | | | | $(BW, 30B) \notin Def(R_2)$ |

FIG. 4

MAP $R_i$

*First level:*

*Second level:*

*Third level:*

*Level 1:*

*Level 2:*

*Level 3:*

Level 1:

Level 2:

Level 3:

CONTEXT RESOLUTION

BACKGROUND

The present invention relates to data processing by digital computer, and more particularly to context resolution.

A collection of documents can be maintained and accessed by various software systems. Documents within the collection can refer to each other using pointers, such as hyperlinks. Each of the documents in the collection can appear in different variants, such as, in different translations and different states of processing, e.g., different versions, dates generated, dates revised, and so forth.

SUMMARY OF THE INVENTION

The present invention provides methods and apparatus, including computer program products, for extended context resolution.

In general, in one aspect, the invention features a method including, in a database, maintaining a collection of documents containing content, each of the documents including a hyperlink to another document and represented by a unique logical information object (LOIO), each unique LOIO pointing to one or more physical information objects (PHIOs), each of the PHIOs containing a variant of the content of a document, the variant being one of more attributes, and determining a suitable PHIO when a LOIO can be response to a request.

In embodiments, the request can be through a hyperlink. The attributes can include a name of a component, a version of the component, a language of the document and/or a country version of the document. Determining can include receiving an entry context representing a desired set of values for one or more attributes, generating a sequence of contexts from the entry context, determining a match of the entry context to one of the contexts in the sequence, and returning a PHIO represented by the match.

The PHIO can represent an exact match, a near match and/or a best match. Each PHIO can be characterized by one context from a set of all possible PHIOs. The set can be characterized by maps that change a single attribute value and maps that change a pair of attribute values, the maps providing a dimension in which neighboring relations with respect to an attribute or a combination of attributes can be defined.

The invention can be implemented to include one or more of the following advantageous features.

The invention can be implemented to realize one or more of the following advantages.

A collection of documents containing many variants is maintained and accessed in a logical fashion. Each document is represented by exactly one logical information object (LOIO). The LOIO has no content. An arbitrary number of physical information objects (PHIOs) belong to every LOIO. Each PHIO contains a variant of the content of the document. The various PHIOs differ by their attributes. For instance, attributes are LANGUAGE and RELEASE. Hyperlinks refer strictly to LOOs, no matter whether the document is linked 'from the outside' (by an application) or 'from the inside' (a PHIO refers to another document). When a LOIO is accessed (through a hyperlink) a suitable PHIO is determined. To this end a desired set of values is given for the attributes. This set is called entry context.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 4 is a table.

Like reference numbers and designations in the various drawings indicate like elements.

DETAILED DESCRIPTION

Figure 1:
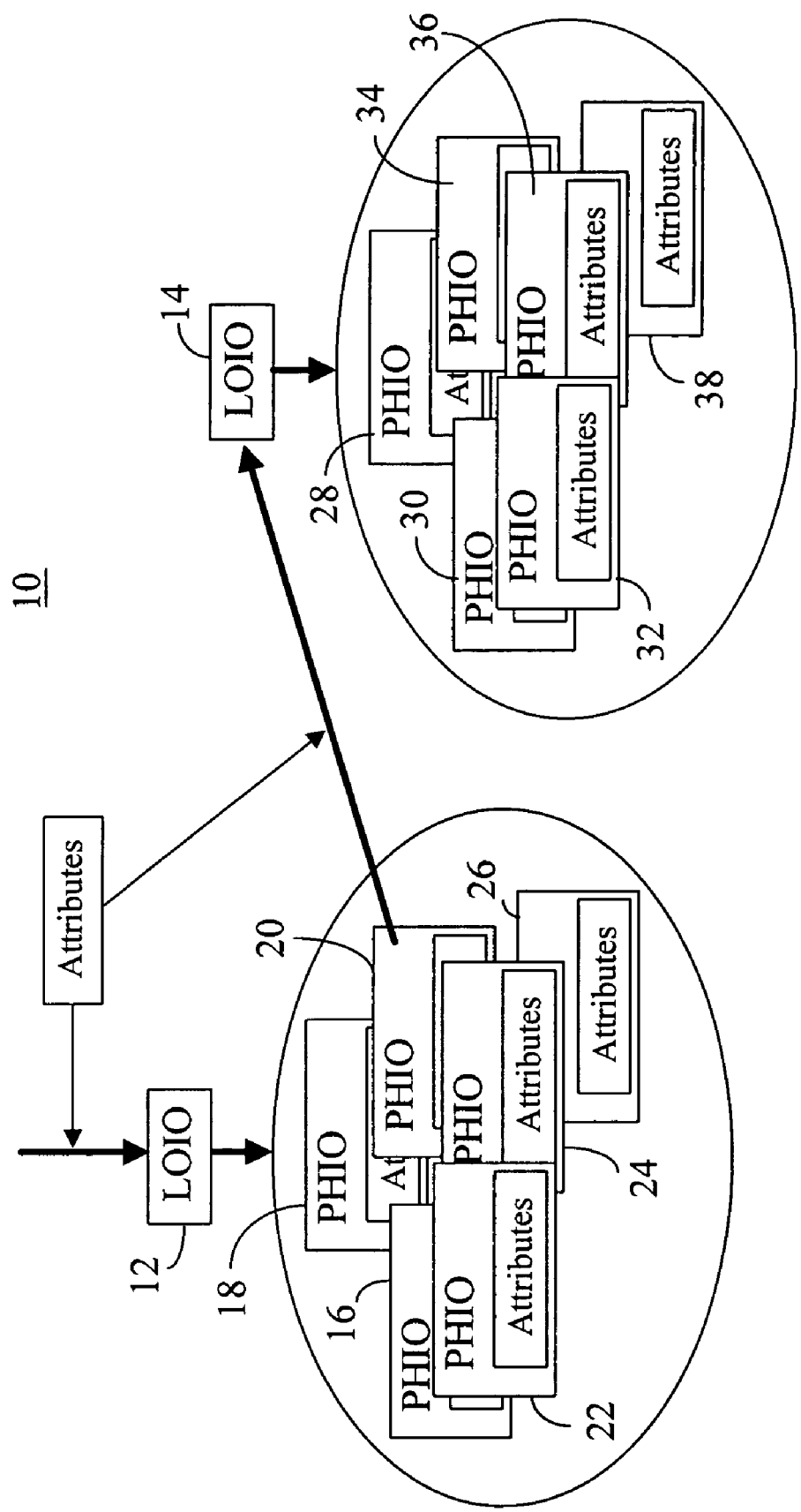
FIG. 1 is block diagram.

As shown in FIG. 1, a collection of documents 10 in accordance with the invention can be accessed. An electronic document does not necessarily correspond to a file. A document may be stored in a portion of a file that holds other documents, in a single file dedicated to the document in question, or in multiple coordinated files. Documents within the collection 10 can refer to each other using pointers, such as by hyperlinks. Each document within the collection 10 can appear in different variants, such as in different language translations, different version numbers and different states of processing, for example. To maintain the variants associated with the collection of documents 10 each document is represented by exactly one logical information object (LOIO) 12, 14. The LOIOs 12, 14 have no content.

An arbitrary number of physical information objects (PHIOs) belong to each LOIO 12, 14. In this example, LOIO 12 includes PHIOs 16, 18, 20, 22, 24, 26 and LOIO 14 includes PHIOs 28, 30, 32, 34, 36, 38. Each PHIO contains a variant of the content of the document. In this example, PHIOs 16, 18, 20, 22, 24, and 26 correspond to variants of the document represented by LOIO 12. PHIOs 28, 30, 32, 34, 36, and 38 correspond to variants of the document represented by LOIO 14. The various PHIOs 16, 18, 20, 22, 24, 26, 28, 30, 32, 34, 36, 38 represent different attributes. Example attributes are LANGUAGE translation and RELEASE number.

Hyperlinks pointing to documents within the collection 10 point only to LOIOs whether the document is linked from outside the collection 10, such as from an application program, or from within the collection 10, such as when one PHIO refers to another document. A suitable PHIO is determined when any LOIO is accessed through a hyperlink.

A request for a document contained in the collection 10 includes a set called an entry context. The entry context includes values given for an attribute or attributes of interest, such as a version number and/or specified language translation. As long as there is a PHIO whose attribute values equal the attribute values of the entry context the choice is trivial, i.e., one PHIO is selected. If there is no such PHIO, then access can be denied or another PHIO used as a replacement.

Denial of access is generally not an acceptable option since in many cases it would lead to failure, e.g. if translations are missing. Therefore, a PHIO is selected whose attributes are closest to the entry context. Since there is no a priori metric for the attributes and consequently no distances can be defined between PHIOs, this approximation to the closest PHIO is carried out algorithmically and referred to as context resolution.

Context resolution is a process for selecting a PHIO that is subject to the entry context. Context resolution generates a sequence of further contexts from the entry context and is referred to as a context chain. The context chain is checked successively to determine whether any PHIO in the context chain has attributes matching or closely matching the attributes specified in the entry context. When a match (or close match) is determined, the matching PHIO is returned in response to the request.

Context resolution need not inevitably give a result, even if we can always assume that at least one PHIO exists. For instance, if a LOIO is generated for a RELEASE r for the first time, then requesting an older RELEASE r'<r in the context leads to no result. On the other hand, we can expect that a missing language version alone does not result in failure.

For ease of discussion, SAP Knowledge Warehouse (KW) is used as an example for describing context resolution. However, the systems and techniques described herein are not limited to SAP KW, rather, they can be used in conjunction with the maintenance and accessing of any collection of documents.

KW is a product from SAP of Waldorf, Germany that provides tools for the development, exchange, integration, translation, and transfer of enterprise knowledge in various media. SAP KW includes methods to enable integration into a wide variety of information systems. As an option, SAP KW can include reusable and modifiable SAP content, such as data models, product information, training materials, and documentation.

Documents within SAP KW include various attributes. For example, one attribute is COMPONENT name. The COMPONENT name is the name of a software component, such as a Strategic Enterprise Management (SEM) component, an Advanced Planner and Optimizer (APO) component, a Customer Relationship Management (CRM) component, a Business Warehouse (BW) component, and so forth. In this specific example an empty name refers to SAP R/3.

Another attribute is RELEASE. RELEASE refers to a version of a COMPONENT. Within one COMPONENT different versions are recorded via their own counting with their own name conventions. Thus, a RELEASE only gives a meaningful value in conjunction with the corresponding COMPONENT.

Another attribute is LANGUAGE. LANGUAGE refers to a language that the document is written in.

Another attribute is COUNTRY and refers to a country version of the document, such as the United States or Germany.

The time of generation of a PHIO is considered an attribute. Time has an infinite and completely ordered range of values. In contrast to this all other attributes have finite ranges of values. In general there are several PHIOs that differ only in time, i.e. for which all other attributes coincide. These PHIOs are backup copies that are generated during creation and correction. Normally the latest PHIO is of interest when accessing content. Consequently, time is not used for versioning by contexts but a similar role is played by the RELEASE attribute. In our discussions with this SAP KW example we do not include time in our considerations about context resolution and assume that several PHIOs differing only in the attribute time are a single PHIO.

Figure 2:
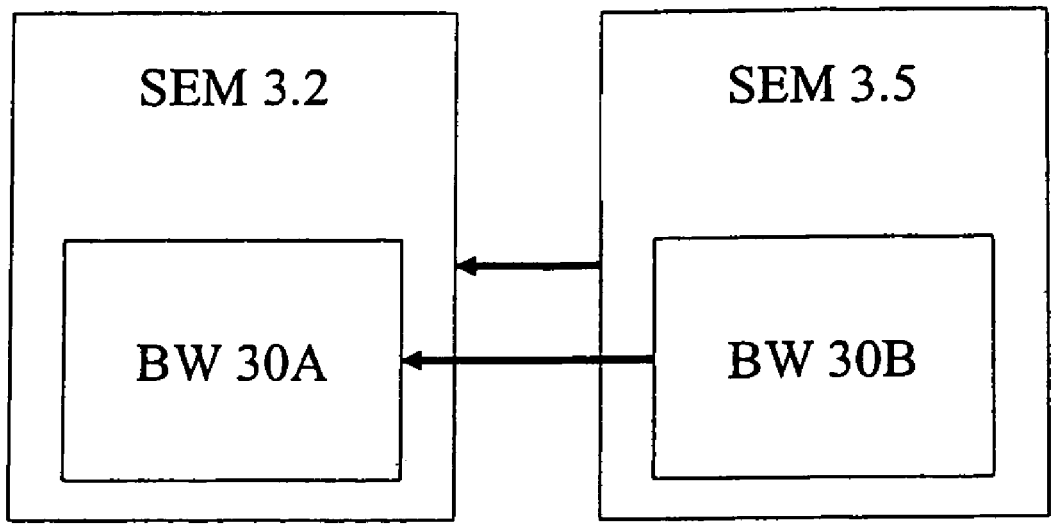
FIG. 2 is a block diagram.
Figure 2:
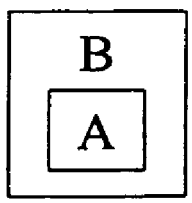

As shown in FIG. 2, a simple context resolution represents a model 100 in which each extension is always based on exactly one software component, which in turn is based on exactly one software component, and so forth. Within each component there are different COMPONENT versions (RELEASEs), and within each RELEASE there are different LANGUAGE and COUNTRY versions.

In this particular example we will consider only the attributes COMPONENT and RELEASE. Context chains are generated in such a way that starting with the entry context first the attribute RELEASE is changed. If there is no predecessor, the COMPONENT attribute is changed.

In model 100, COMPONENT SEM 3.5 is based on COMPONENT BW 30B and COMPONENT SEM 3.2 is based on COMPONENT BW 30A. Model 100 causes the following context chains to arise:

Entry context SEM 3.5: SEM3.5→SEM3.2→BW 30B→BW 30A

Entry context SEM 3.2: SEM 3.2→30A

Entry context BW 30B: BW 30B→30A

Entry context BW 30A: BW 30A

A mathematical model can be used to describe the above context resolution. Let n attributes $\alpha_1 \in A_1$ to $\alpha_n \in A_n$ be given where each range of values $A_i$ is finite.

A context is defined by a tuplet $(\alpha_1, \ldots, \alpha_n) \in K = A_1 \times \ldots \times A_n$. K is the set of all possible contexts.

On an assumption that each PHIO can be characterized by exactly one context from K the set of existing physical information objects PHIO can be regarded as a subset of K ($PHIO \subseteq K$).

For the context resolution predecessor relations between attributes are essential. Yet in order to cover the cases that are relevant for practical purposes it is not sufficient to give a partial or complete ordering on each set of values $A_i$. Instead the following scheme is introduced:

On the set K we define m partial and one-valued maps $R_i$: $K \rightarrow K$. For all known practical cases two kinds of maps are needed:

1. Maps that change only one single attribute $\alpha_x$.

To this end let a partial map $K_i$: $A_x \rightarrow A_x$ be given. It describes how the value of the attribute $\alpha_x$ changes while all other attributes keep their values:

$$R_i(a_1, \ldots, a_x, \ldots, a_n) = (a_1', \ldots, a_x', a_n') \text{ with}$$

$$a_k' = a_k \text{ for } k \neq x,$$

$$a_x' = K_i(a_x).$$

For instance, such a map is defined for the LANGUAGE attribute.

2. Maps that change a pair of attributes $(a_x, a_y)$.

To this end let a partial map $K_i: A_x \times A_y \rightarrow A_x \times A_y$ be given. The partial map describes how the values of the attributes of the pair change while all other attributes keep their values. In this case the attributes $a_x$ and $a_y$ are also called interdependent with respect to the map $R_i$:

$$R_i(a_1, \ldots, a_x, \ldots, a_y, \ldots, a_n) = (a_1', \ldots, a_x', \ldots, a_y', \ldots, a_n') \text{ with}$$

$$a_k' = a_k \text{ for } k \neq x \text{ and } k \neq y$$

$$(a_x', a_y') = K_i(a_x, a_y).$$

For instance, a map of this kind is defined for the attribute pair (COMPONENT, RELEASE), since the RELEASE depends on the COMPONENT. On the other hand, there is also a map of the first kind in which only the attribute RELEASE changed, as will be described below. An extension of this scheme to tuplets with more than two attributes is easily possible.

In a way each map $R_i$ forms a "dimension" in which neighboring relations (predecessor and successor) with respect to an attribute or a combination of attributes are defined. Transfers from one context to another, "nearby" context are possible via these relations. Depending on the map, i.e., on the "dimension," these transfers can take place in different "directions." In this way it is possible to navigate in the m-dimensional space that is spanned by the maps.

In order to avoid infinite loops during context resolution we assume that for each context $K \in \mathcal{K}$ the recursively defined sequence $(x_n)$ with $$x_0 = K,$$

$$x_{n+1} = R_i(x_n)$$

terminates after finitely many steps, i.e. there is some n such that $R_i$ is undefined for $x_n$. This is true if and only if in all sequences $(x_n)$ each context occurs at most once. Then the map $R_i$ is called recursion free. The property of $R_i$ to be recursion free is equivalent to $K_i$ being recursion free.

Figure 3:
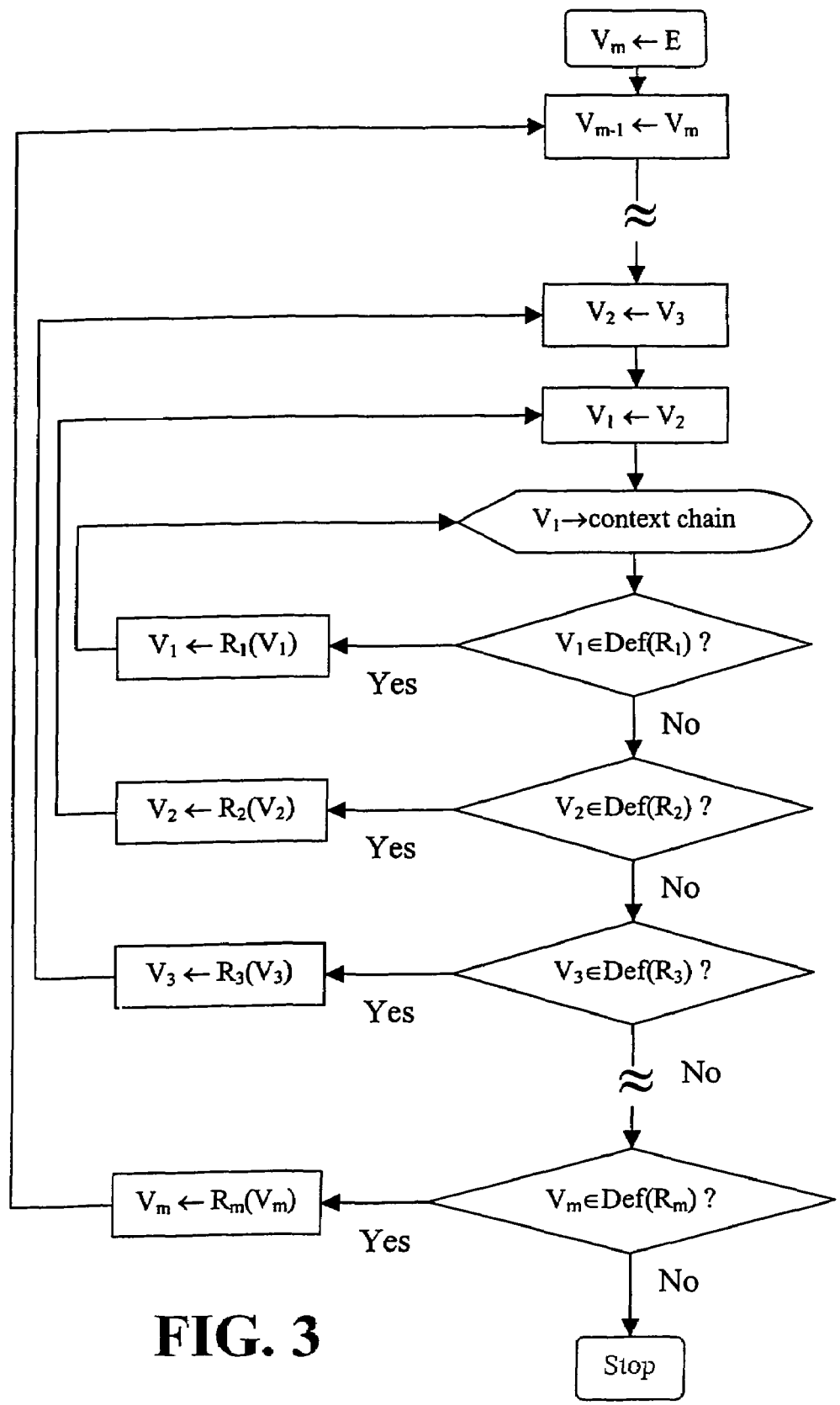
FIG. 3 is a flow diagram.

As shown in FIG. 3, a simple context resolution process 200 gets the entry context $E \in \mathcal{K}$ as input and generates from it the context chain. During this process 200 the individual maps are applied in the order of their numbering, i.e. map $R_1$ is applied first, then the map $R_2$, and so forth.

For internal processing, process 200 uses the variables $V_1, \ldots, V_m$. Each variable $V_i$ contains a context. The expression $V_i \in \text{Def}(R_i)$ means, that the map $R_i$ is defined for $V_i$.

For the model 100 of FIG. 2, we set:

$A_1 = \{\text{SEM, BW}\}, A_2 = \{30A, 30B, 3.2, 3.5\}$ and $R_1(\text{SEM}, 3.5) = (\text{SEM}, 3.2)$
$R_1(\text{BW}, 30B) = (\text{BW}, 30A)$ together with $R_2(\text{SEM}, 3.5) = (\text{BW}, 30B)$
$R_2(\text{SEM}, 3.2) = (\text{BW}, 30A)$ The map $R_1$ changes only the RELEASE attribute. The map $R_2$ changes attribute COMPONENT and attribute RELEASE at the same time.

According to these relations, the context chain for the entry context SEM 3.5 arises as shown in FIG. 4. Thus, the context chain SEM 3.5→SEM 3.2→BW 30B→BW 30A is calculated that is the result as desired shown in FIG. 2.

All cases of practical interest can be derived from the mathematical model to generate a physical model that mirrors the process 200 in a graphical way. Assume that the number of attributes and maps are equal (m=n) and that there are only two types of maps $R_i$:

I. The map $R_i$ changes exactly one attribute $\alpha_x$. Let $K: A_x \rightarrow A_y$ be the corresponding map on this attribute.

II. The map $R_i$ changes exactly two attributes $\alpha_x$, $\alpha_y$. With the exception of one further map $R_j$, which changes the attribute $\alpha_y$, these attributes are changed by no other map. Let $K_i: A_x \rightarrow A_y \rightarrow A_x \times A_y$ be the map belonging to $R_i$ and $K_j: A_y' A_y$, the map belonging to $R_j$.

Furthermore the map $R_j$ is applied during context resolution always before $R_i$, i.e. according to the numbering of maps we have i>j.

For a physical model let a counter with m wheels be given. The wheels are arranged side by side from left to right. Each wheel possesses its own number of values in a prearranged order and can be moved forward step by step. If all values of a wheel are processed, i.e. if the start value is reached again by a further step then in addition the wheel neighboring to the left is advanced one step. The start distribution of values on the wheel corresponds to the entry context. Each wheel corresponds to a map. The order of wheels corresponds to the order in which the maps are applied during context resolution, albeit from right to left.

Figure 5:
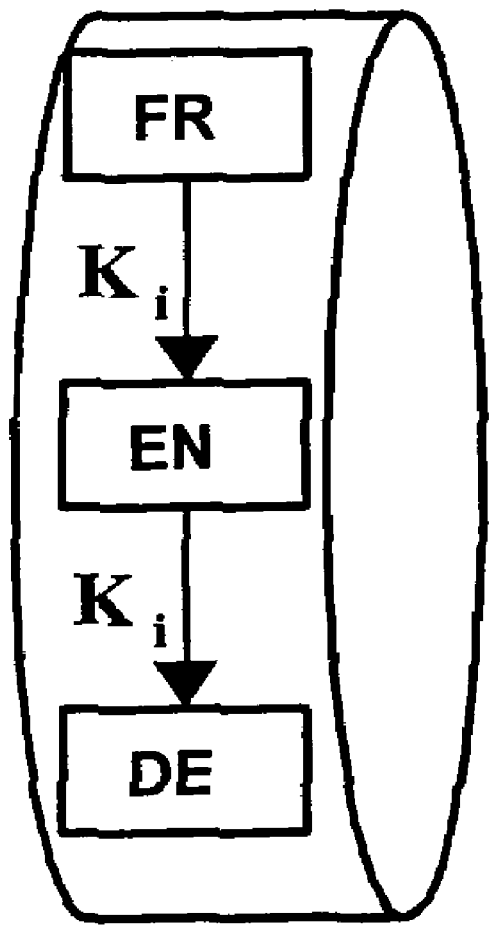
FIG. 5 is a block diagram.

As shown in FIG. 5, if a wheel 400 corresponds to a map $R_i$ of type I, which changes the attribute $\alpha_x$, and if this attribute is changed by no other map of type II, then on the wheel 400 the elements of the sequence of values in $A_x$ are written by repeated application of the map $K_i$ starting with the entry context.

Figure 6:
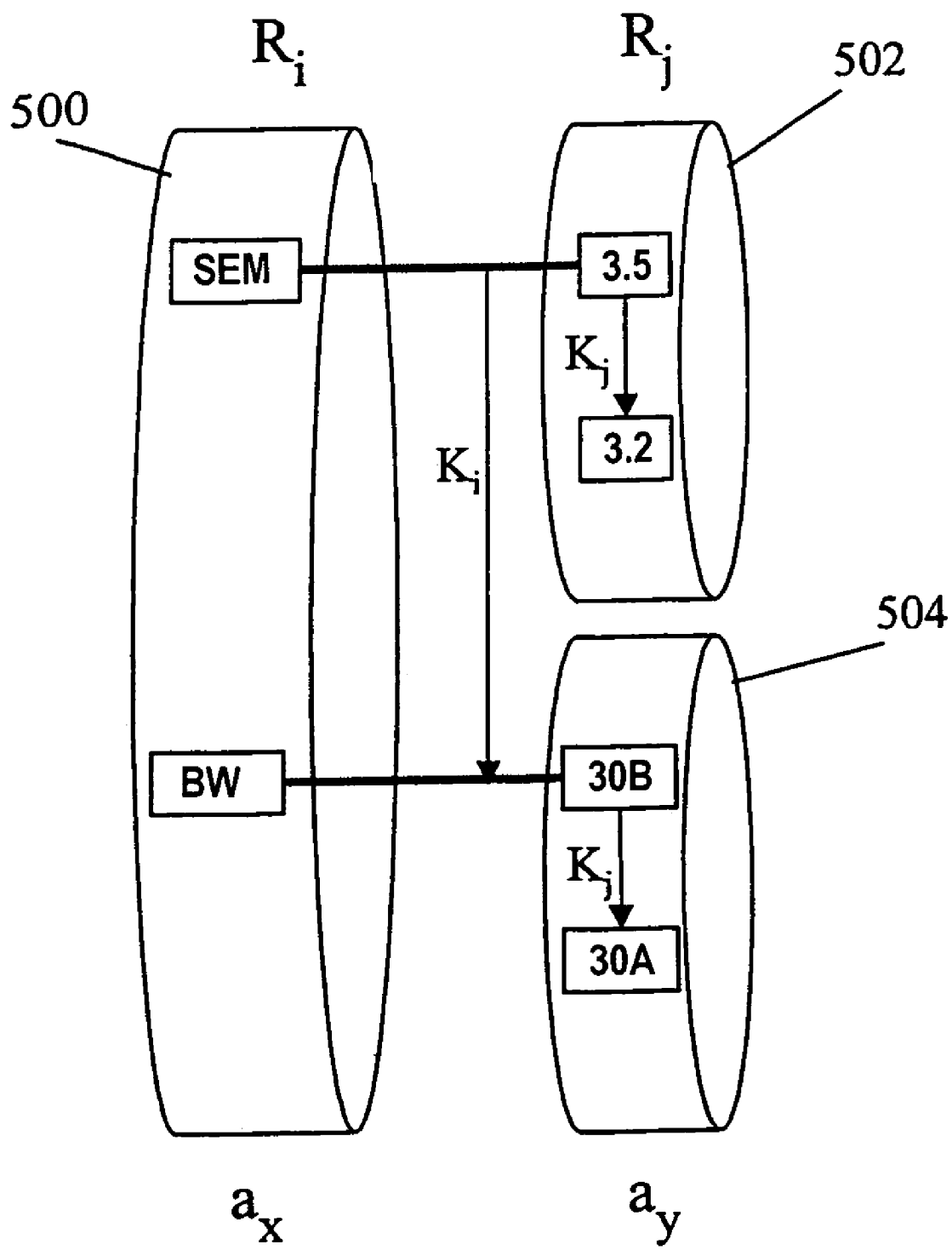
FIG. 6 is a block diagram.

As shown in FIG. 6, if a wheel 500 corresponds to a map $R_i$ of type II, which changes the attributes $\alpha_x$, $\alpha_y$, then somewhere to the right of wheel 500 a wheel 502 is located that corresponds to the map $R_j$ of type I. This changes the attribute $\alpha_y$. On the wheel 500 for $R_i$ the values of the COMPONENT $a_x$ in the recursively defined sequence of pairs are written from the entry context by repeated application of $K_i$. For every value on this wheel 500 a set of values on the wheel 502 for $R_j$ is determined by the corresponding attribute pair. This results from the repeated application of the map $K_j$ to the COMPONENT $\alpha_y$ of the attribute pair. As a consequence, this means that when the wheel 502 corresponding to $R_i$ is advanced one step, new values for the wheel 504 corresponding to $R_j$ are assigned.

This example is valid for the entry context (SEM, 3.5) in the example shown in FIG. 2. The wheel for the attribute RELEASE contains at first the values "3.5" and "3.2." However, after these values are processed and the wheel for the attribute COMPONENT is set to the value "BW," the values on the wheel for the attribute RELEASE are recalculated ("30B" und "30A"). Of course, the number of values can change.

A second example illustrates why the dependency between two attributes is modeled in a relatively complicated way. From the above example, it does not arise why the two attributes cannot be regarded as one common value.

Figure 7:
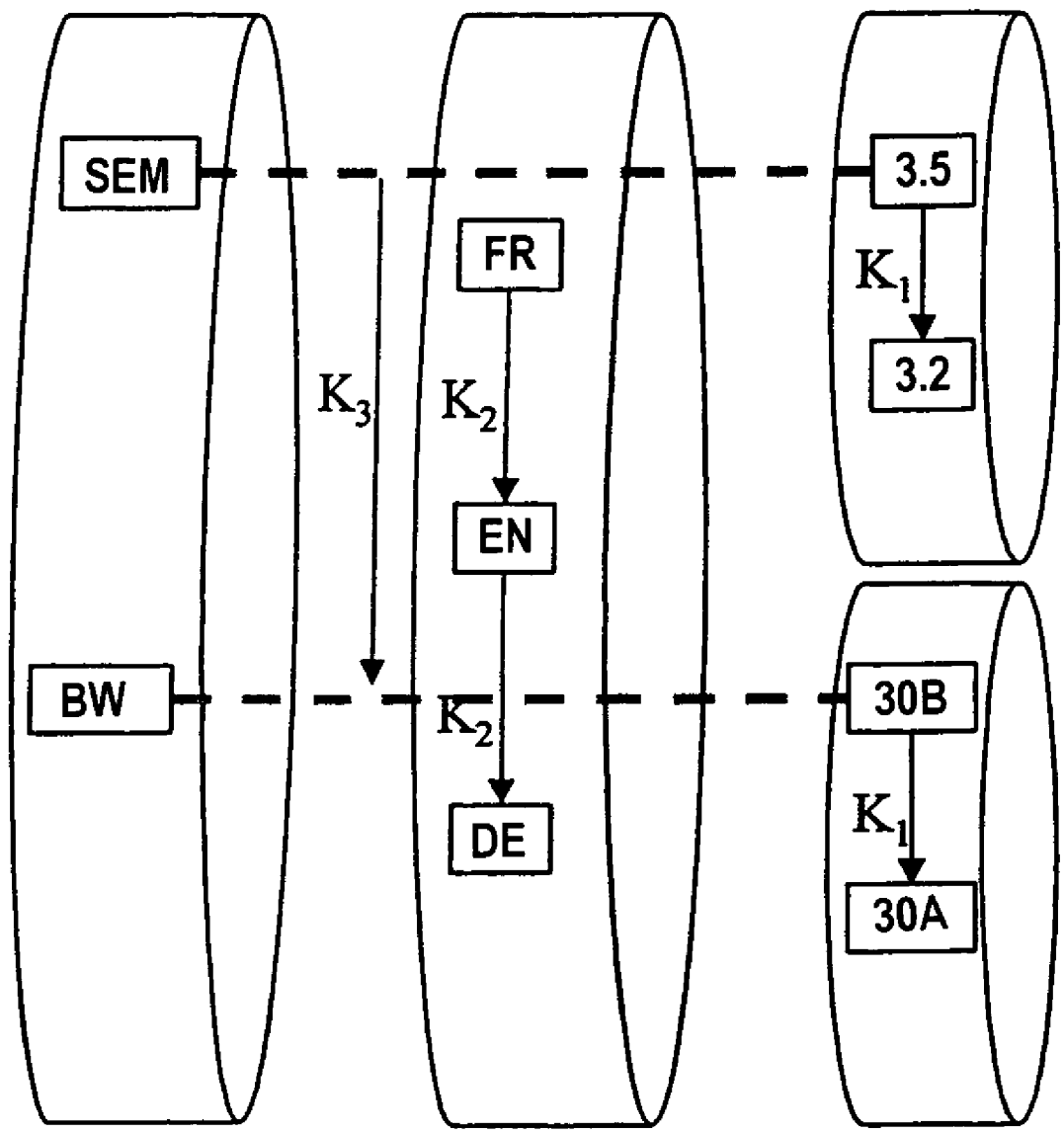
FIG. 7 is a block diagram.

As shown in FIG. 7, assume that a search strategy for a suitable PHIO includes first looking through the various RELEASE values of a COMPONENT, then changing the language and only after that a change to another COMPONENT takes place. Here, between the attributes COMPONENT and RELEASE, the language is pushed in. The desired behavior can be simulated if the attribute RELEASE is changed in two maps.

Extended context resolution involves examples in which an extension is based on several software COMPONENTs, which in turn can be based on several software COMPONENTs, and so forth. Therefore, priorities are set that determine the order of processing the COMPONENTs. These priorities can be set depending on the entry context.

Figure 8:
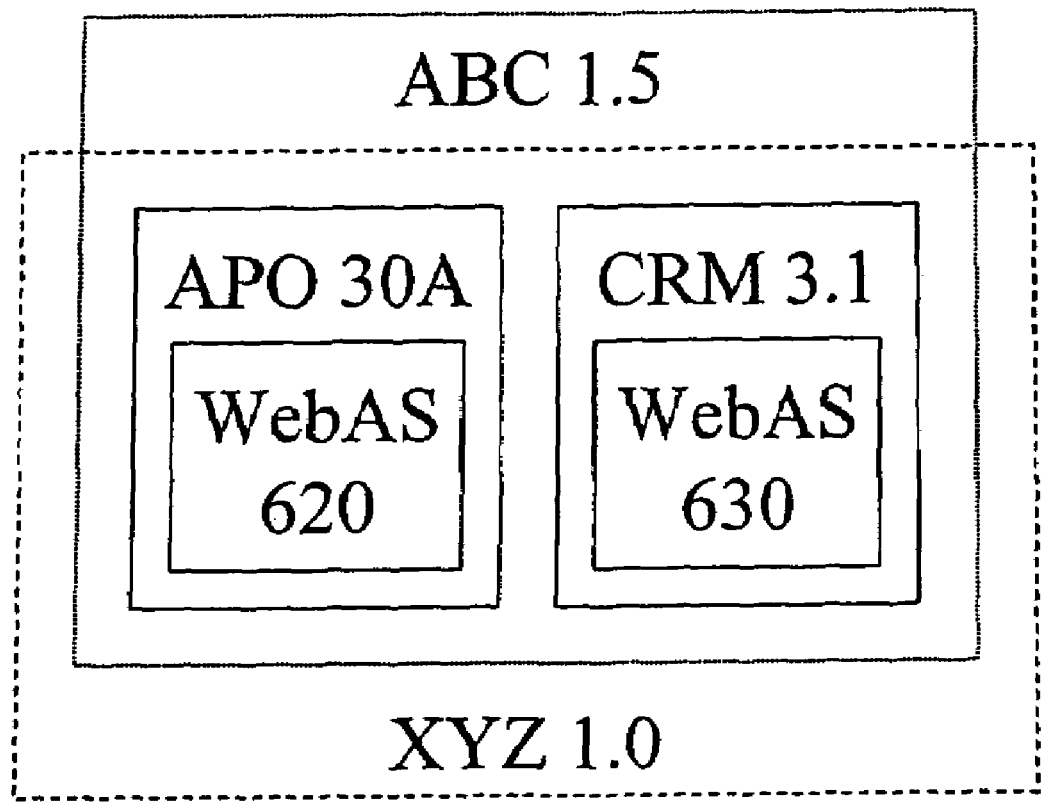
FIG. 8 is a block diagram.

As shown in FIG. 8, for example, both APO 30A and CRM 3.1 are based on different RELEASEs of Web AS. Let us assume that two scenarios ABC 1.5 and XYZ 1.0 want to use both COMPONENTs, but the order of the contexts for APO 30A and CRM 3.1 when COMPONENT is changed are different for the context chains of the entry contexts ABC 1.5 and XYZ 1.0.

For the entry context ABC 1.5 the order when changing COMPONENT is

ABC 1.5→APO 30A→CRM3.1→WebAS 620→WebAS 630 and for the entry context XYZ 1.0 it is

XYZ 1.0→CRM 3.1→APO 30A→WebAS 630→WebAS 620

Figure 9:
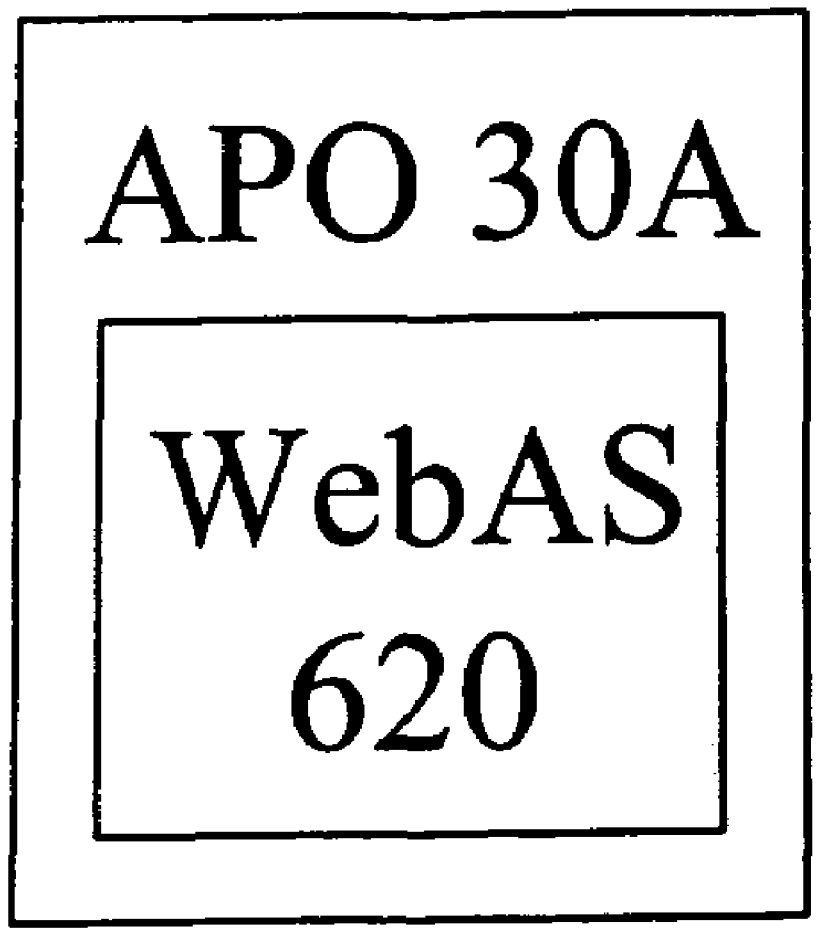
FIG. 9 is a block diagram.

RELEASE is always changed when COMPONENT is changed. One should not use the change of COMPONENT to only change RELEASE, since there is a map for this purpose. In the present example, this is unavoidable since we cannot remove the COMPONENT WebAS 620 in the part shown in FIG. 9 without disturbing the context chain for the entry context APO 30A. In addition, in the context chain of ABC 1.5, it is annoying that WebAS 620 appears before WebAS 630.

Extended context resolution differs only in one detail from that of simple context resolution. In the simple case, each map $R_i$ generates recursively defined sequences that are woven into one another, i.e., first the sequence for $R_1$ that is constructed from the entry context is followed step by step, then one step is taken in the sequence for $R_2$ that is constructed from the entry context, whereupon the sequence for $R_1$ is followed that is constructed from this new start context, and so forth.

In the extended case, the sequences are no longer recursively defined, but in the generation of each new sequence element not only the previous context is used but also the entry context. Therefore, in this case the maps $R_i$ have two arguments from K.

On the set K we define m partial and one-valued maps $R_i$: K×K→K. In order to avoid infinite loops during context resolution, we assume that for every entry context E∈K and every context K∈K the sequence $(x_n)$ with $x_0 = K$, $x_{n+1} = R_i(E, x_n)$ terminates after finitely many steps, i.e. there is some n, so that $R_i$ is undefined for $(E, x_n)$.

Here we can also use associated partial maps $K_i$: K×$A_x$ →$A_x$ resp. $K_i$: K×$A_x$×$A_y$→$A_x$×$A_y$ instead of the maps $R_i$. Similar to the simple context resolution, in these maps only attributes are gathered that change their values.

Figure 10:
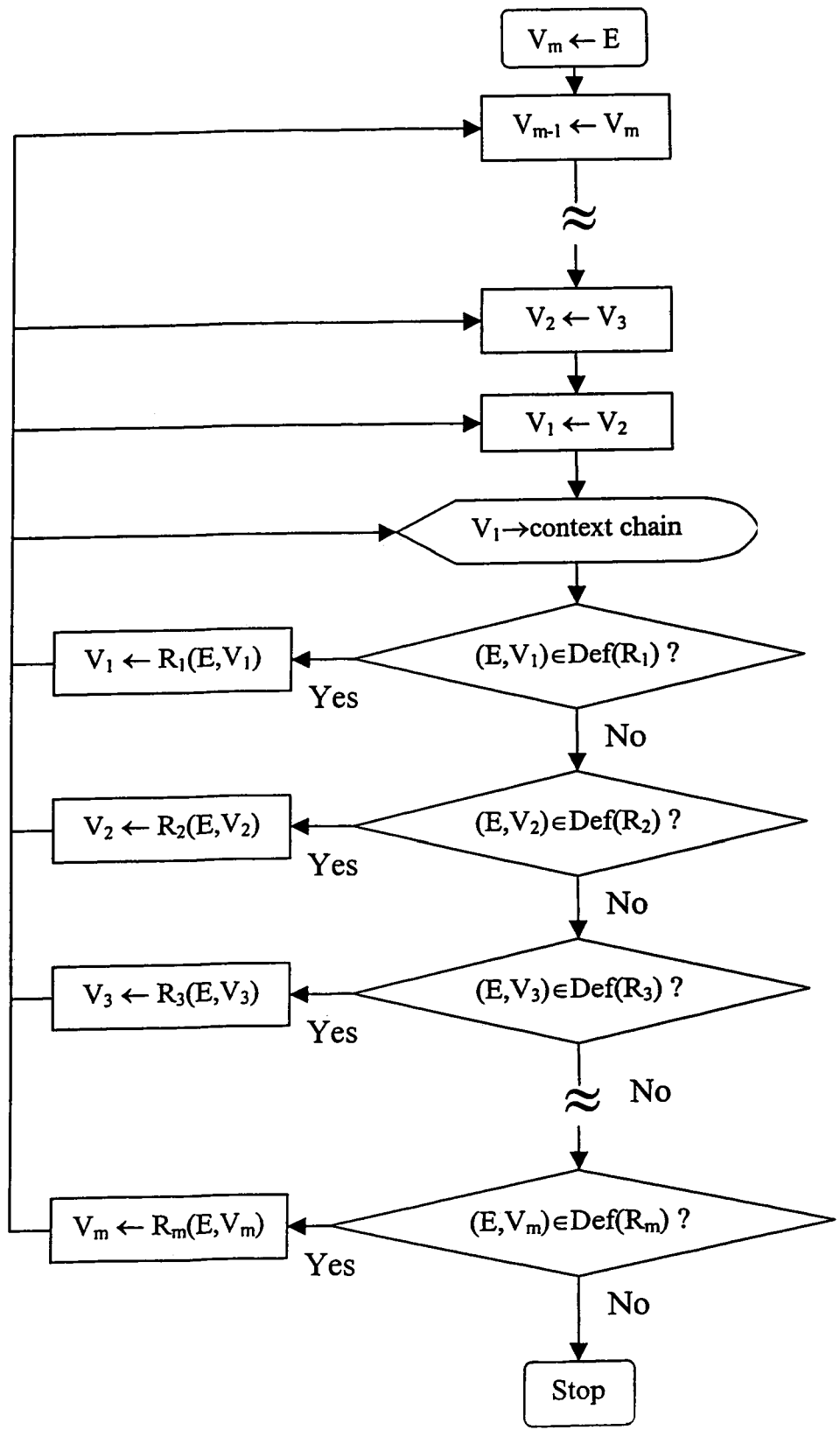
FIG. 10 is a flow diagram.

As shown in FIG. 10, a process 1000 receives an entry context E∈K as input and generates from it a context chain. During this process 1000 the individual maps are applied in the order of their numbering, i.e. the map $R_1$ is applied first, then the map $R_2$, and so forth.

For internal processing, process 1000 uses the variables $V_1, \ldots, V_m$. Each variable $V_i$ contains a context.

Figure 11:
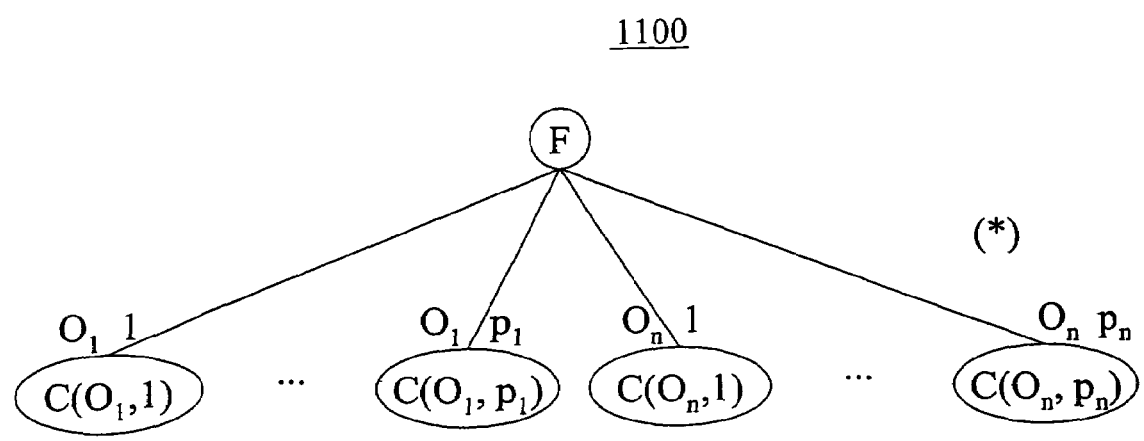
FIG. 11 is a tree diagram.

The additional argument in the maps $R_i$ offers a great amount of freedom and means that for every entry context, an arbitrary context chain can be defined independent of the other entry contexts (even if only one map is used). As shown in FIG. 11, a scheme 1100 is used for constructing a map $R_i$ in order to restrict the generation of new context chains and support the user with their construction. A finite number of tree fragments is given. Here, $p_1, \ldots, p_n$ are natural numbers and F, $O_1, \ldots, O_n$, $C(O_1, 1)$, $C(O_1, p_1), \ldots, C(O_n, 1), \ldots, C(O_n, p_n)$ are contexts from K. The context $O_i$ is called owner and the numbers $1, \ldots, p_i$ priorities of the nodes $C(O_i, 1), \ldots, C(O_i, p_i)$. Specifying an owner is optional. For every context F there is at most one tree fragment that has F as a root node. The owners specify for what superior contexts the branches of the tree fragment are valid. Thus, it is possible to control in every step the further construction of the context chain by the part that was already generated. The priorities specify in which order the contexts are to be build into the context chain.

Figure 12:
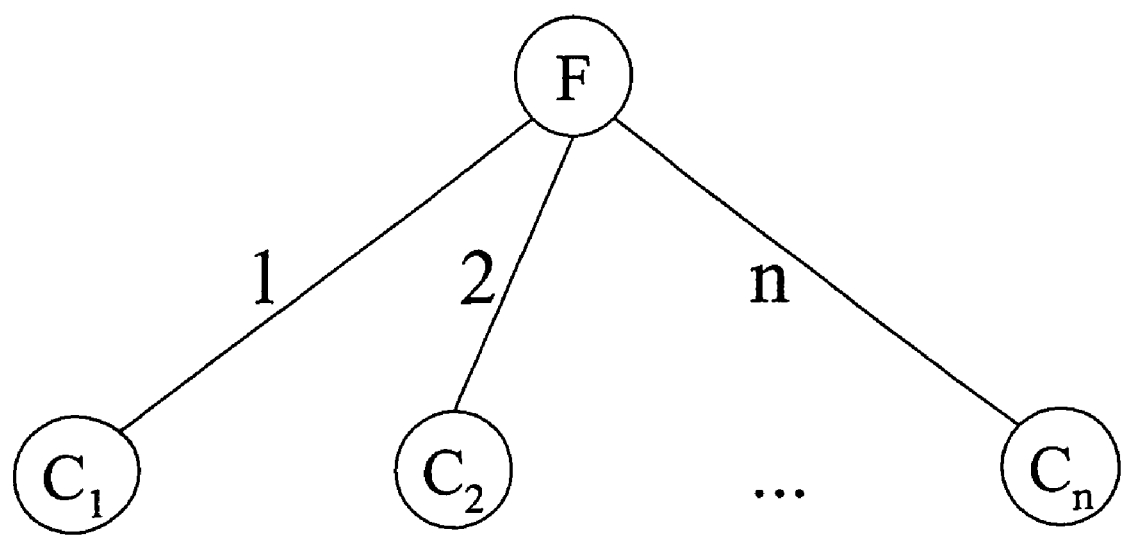
FIG. 12 is a tree diagram.

As shown in FIG. 12, for example, if a software COMPONENT marked by F is based on the software COMPONENTs marked by $C_1, \ldots, C_n$ and if first the documentation for F and after that the documentation for $C_1, \ldots, C_n$ shall be searched with priorities $1, \ldots, n$, then the tree fragment is defined. Since no owners are specified, this dependency is valid for every software COMPONENT that is based on the one marked by F.

Figure 13:
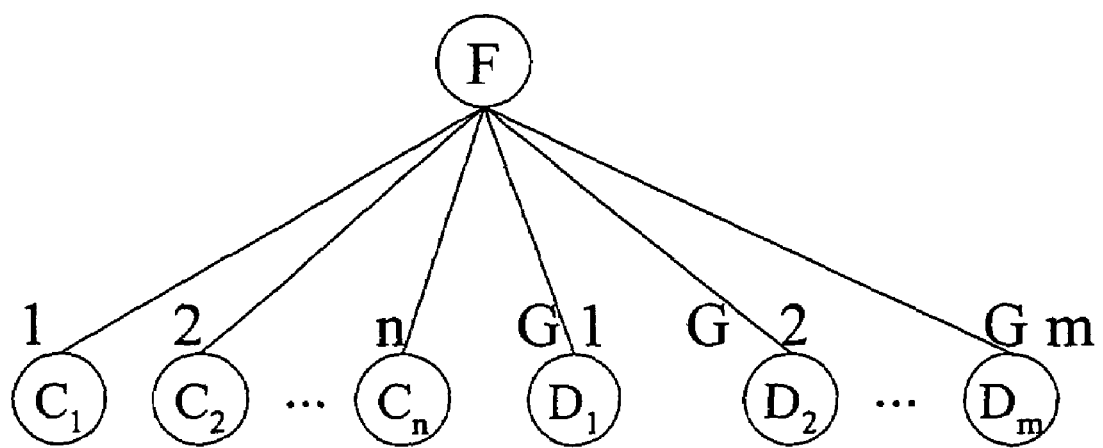
FIG. 13 is a tree diagram.

As shown in FIG. 13, if the COMPONENT marked by G is based on F and we want to change the context chain for the entry context G in such a way that after F the contexts $D_1, \ldots, D_m$ are traversed then the tree fragment is extended. In order to define for a context E∈K the map $R_i$ for the pairs (E,•), we generate level by level a tree from the tree fragments with the context E as root node. If the levels $1, \ldots, k$ are already there then the level k+1 is generated as follows.

Below each node of the level k we place further nodes step by step. The nodes of level k are processed from left to right. If a node of level k is occupied by the element F∈K, we place all nodes $C(O_1, 1), \ldots, C(O_n, p_n)$ from (*) below F. The order of these nodes is determined as follows:

All nodes with the same owner are grouped together. Within such a group the nodes are ordered left to right by ascending values of their priority.

Groups are deleted whose corresponding owner does not occur among the nodes of the levels $1, \ldots, k$ of that part of the tree that was already constructed. Nodes without an owner are not affected by this.

The remaining groups are ordered from left to right according to the order in which their owners occur in the levels $1, \ldots, k$ of the already constructed part of the tree. Here the order in the tree is defined level by level and within the levels from left to right. The group without an owner is placed at the end.

When level k+1 is filled, it is checked from left to right for every node of this level whether it is occupied by an element of K which already occurs in level K+1 or in one of the levels $1, \ldots, k$. If this is true, this node is deleted.

We get the map $R_i$ on the pairs (E,•) by running through the tree level by level and within the levels from left to right. Here we have $R_i(E,x)=(E,y)$ if and only if x has the immediate successor y with respect to this order of traversal. If x is the last element or does not occur in the sequence, then $R_i$ is undefined for (E,x). The maps $R_i$ defined in this way are automatically recursion free.

Figure 14:
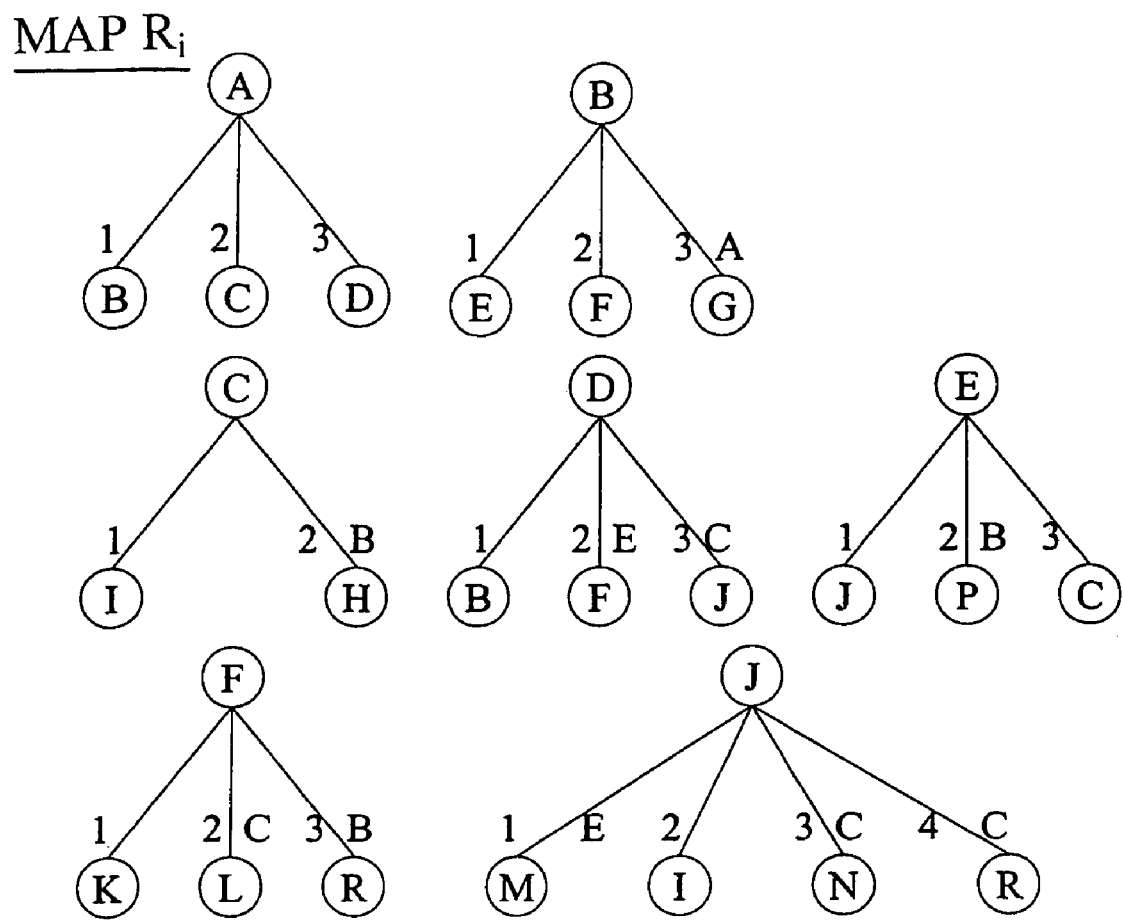
FIG. 14 is a tree diagram.
Figure 15:
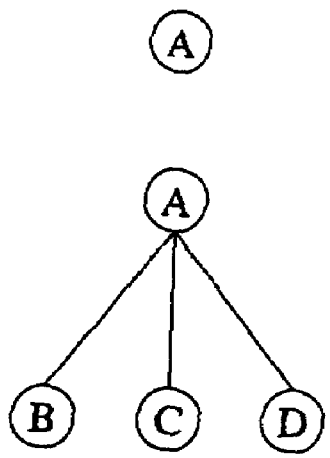
FIG. 15 is a tree diagram.
Figure 15:
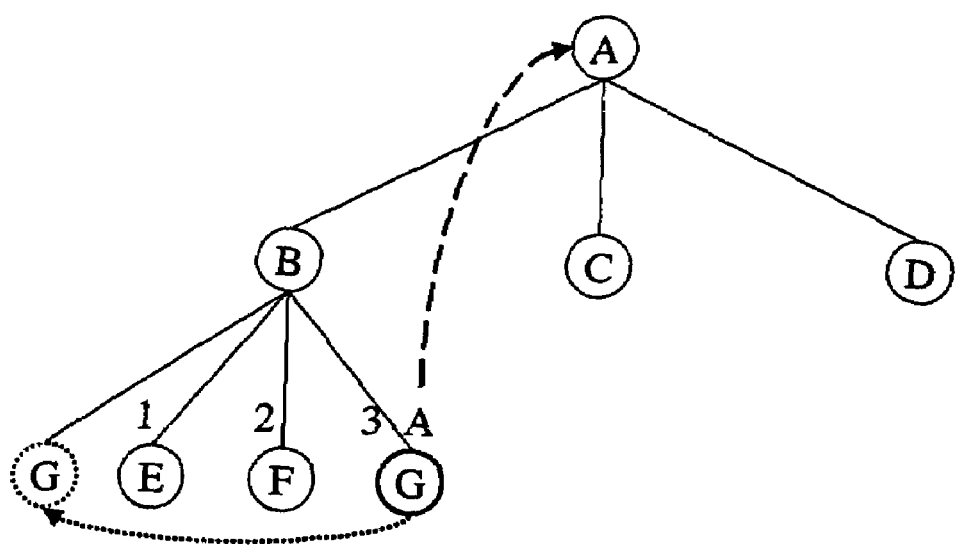

As shown in FIG. 14, a map $R_i$ is configured to determine the values of $R_i$ on the pairs (A,•). We construct the tree level by level as shown in FIG. 15. All child nodes of the tree fragment below A appear in the second level in the order given by their priority since none has an owner. No node is deleted since none occurs in duplicate.

Figure 16:
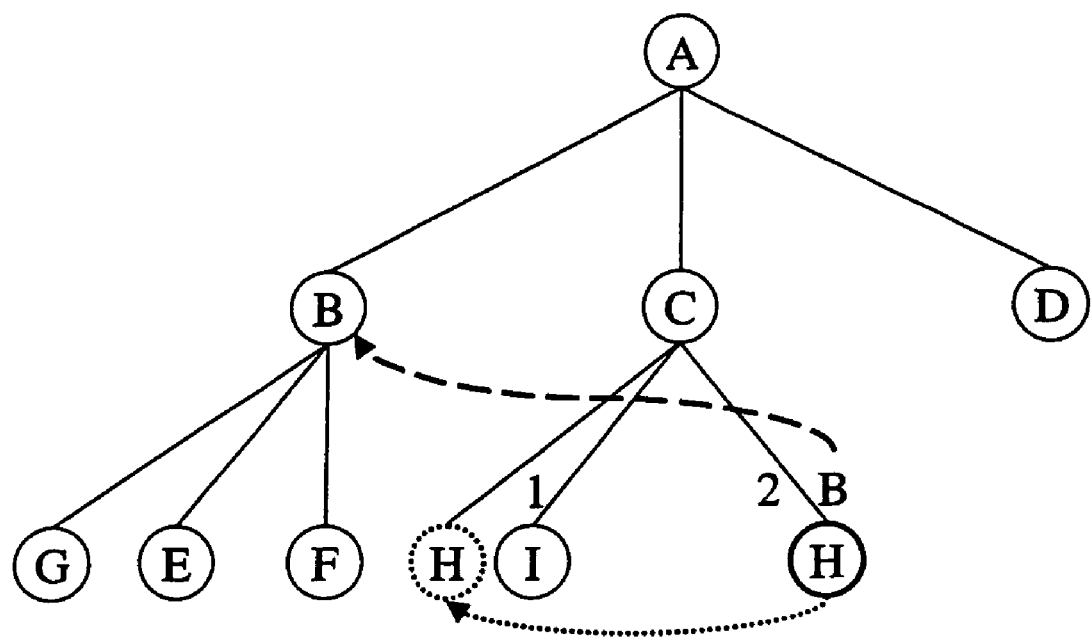
FIG. 16 is a tree diagram.

In the tree fragment shown in FIG. 16, below B the node G has the owner A, which already occurs in the first level. Therefore G moves to the first place, followed by E and F according to their priorities.

Figure 17:
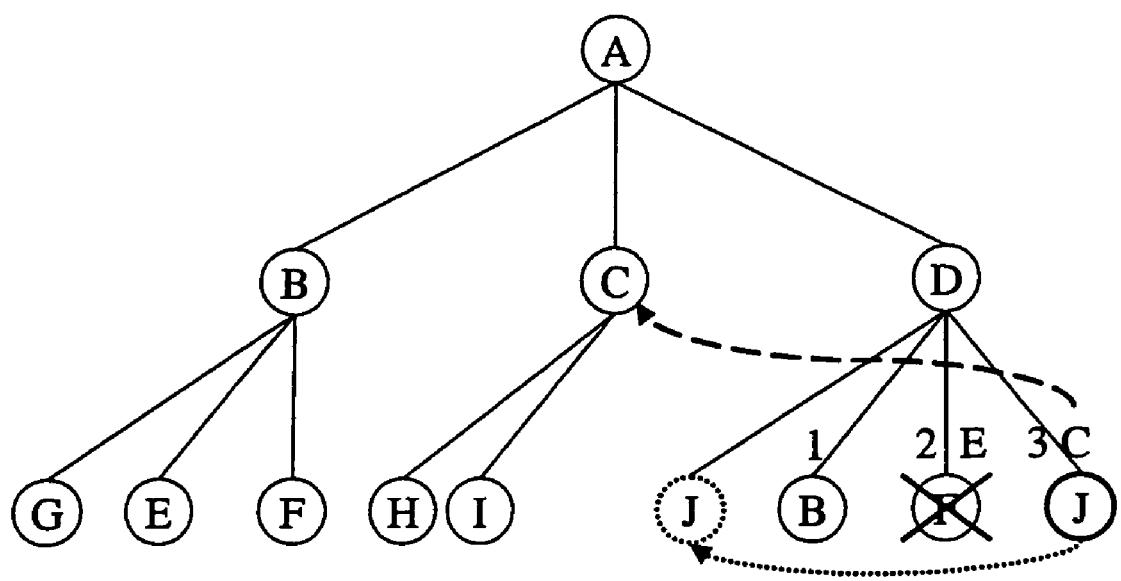
FIG. 17 is a tree diagram.

In the tree fragment shown in FIG. 17, below C the node H has the owner B, which already occurs in the second level. Therefore H moves to the first place, followed by I.

Figure 18:
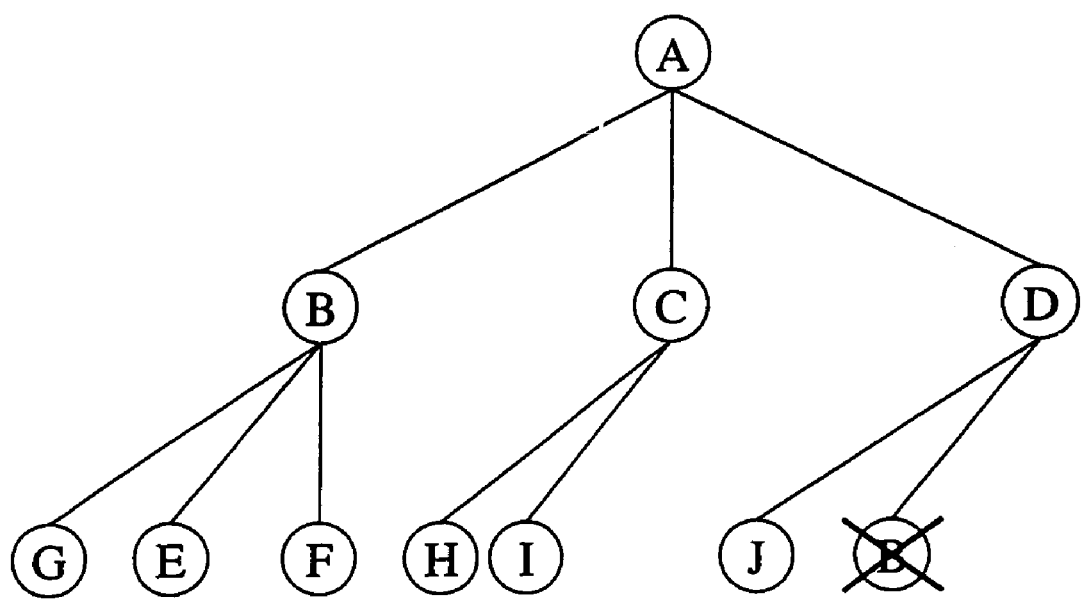
FIG. 18 is a tree diagram.
Figure 19:
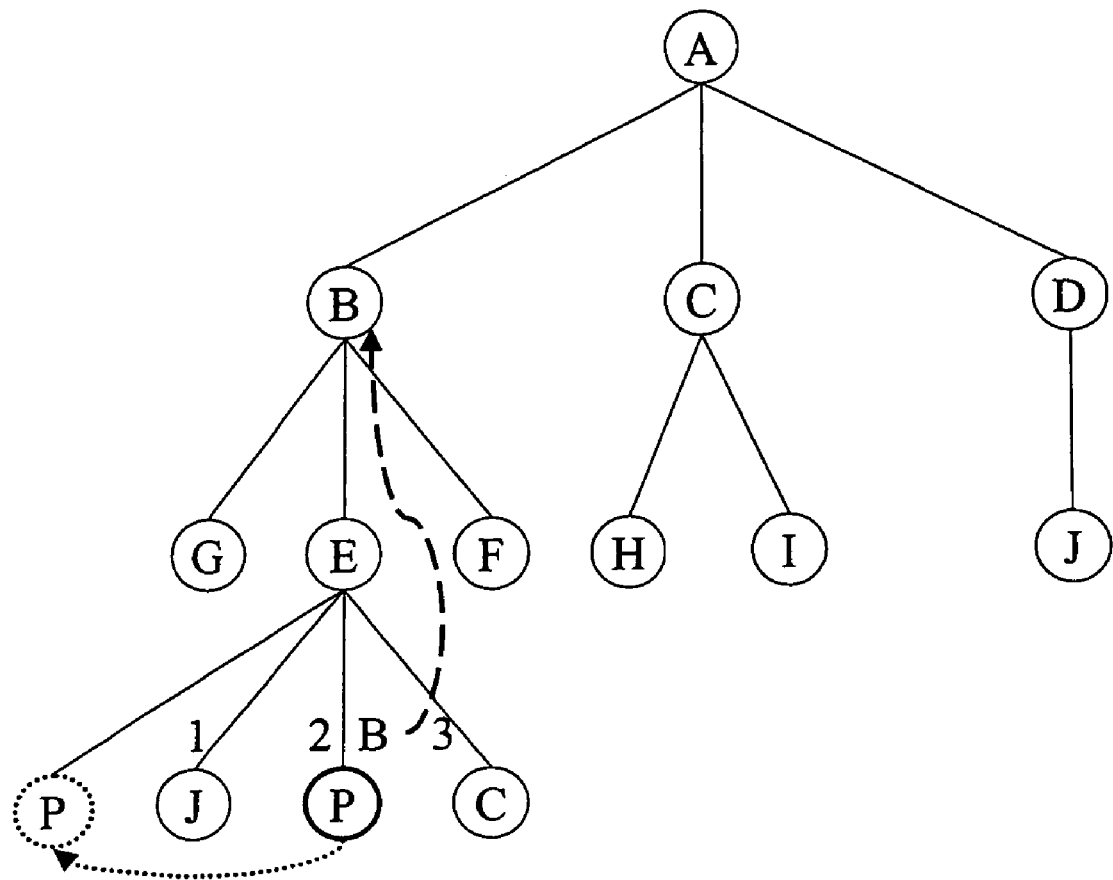
FIG. 19 is a tree diagram.

In the tree fragment shown in FIG. 18, below D the node F has the owner E. This does not occur in the first and second level. Therefore F is deleted (the existence of E in the third level does not matter). The node J has the owner C, which occurs in the second level. Therefore J moves to the first place, followed by B. As shown in FIG. 19, since B already occurs in the second level, it is deleted in the third level.

Figure 20:
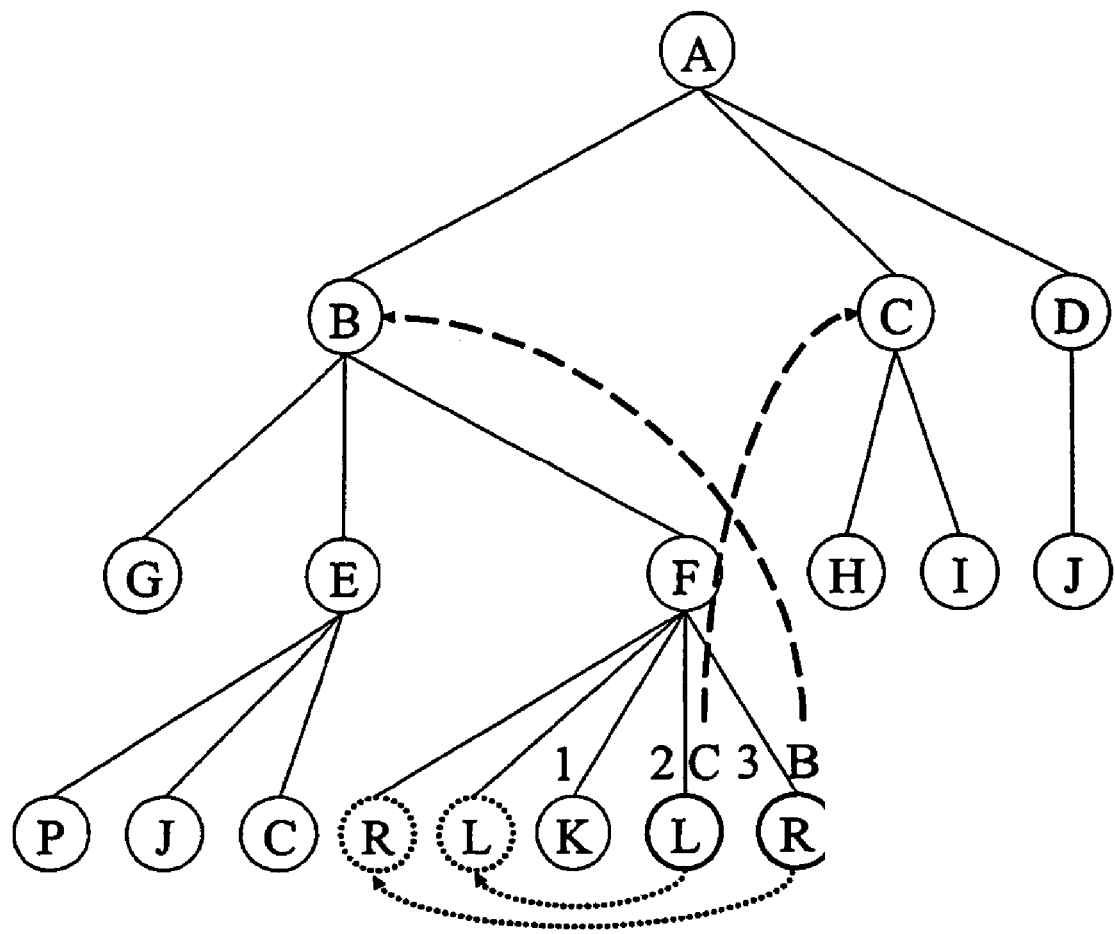
FIG. 20 is a tree diagram.

In the tree fragment shown in FIG. 20, below E the node P has the owner B which already occurs in the second level. Therefore P moves to the first place followed by J and C according to their priorities.

Figure 21:
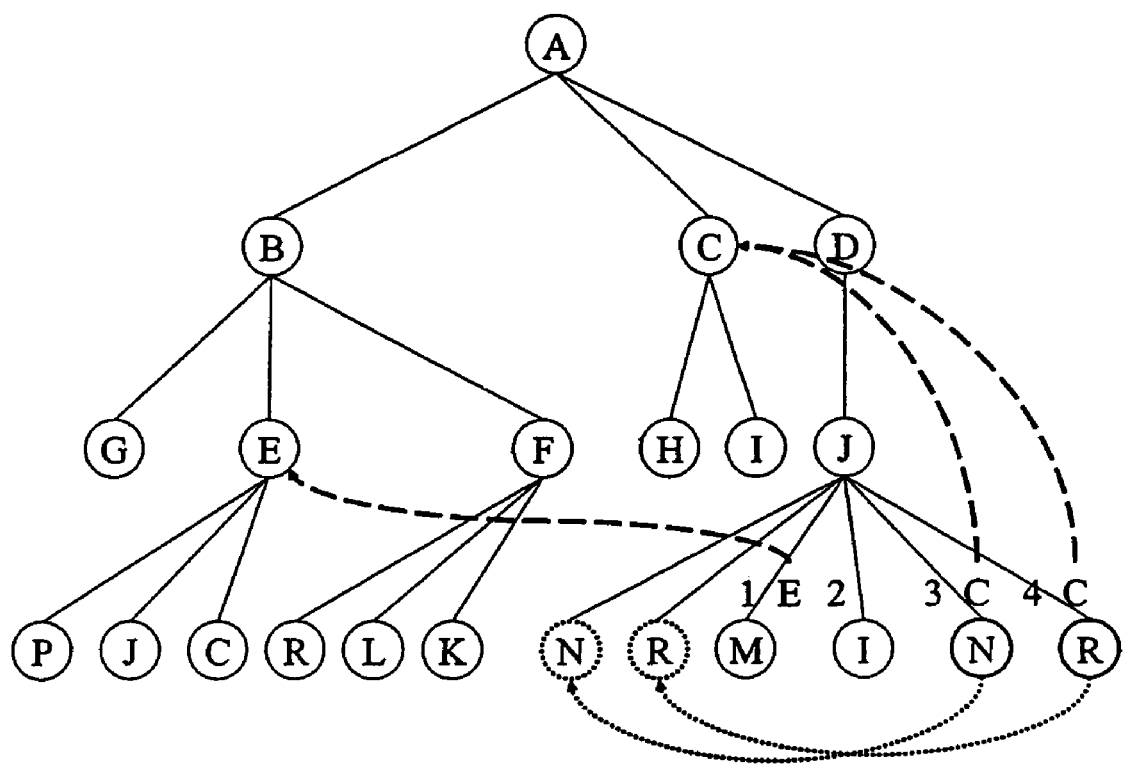
FIG. 21 is a tree diagram.

In the tree fragment shown in FIG. 21, below F the nodes L and R have the owners C and B which already occur in the second level. Here B appears before C. Therefore L and R move to the first place followed by K, and in fact R appears before L.

Figure 22:
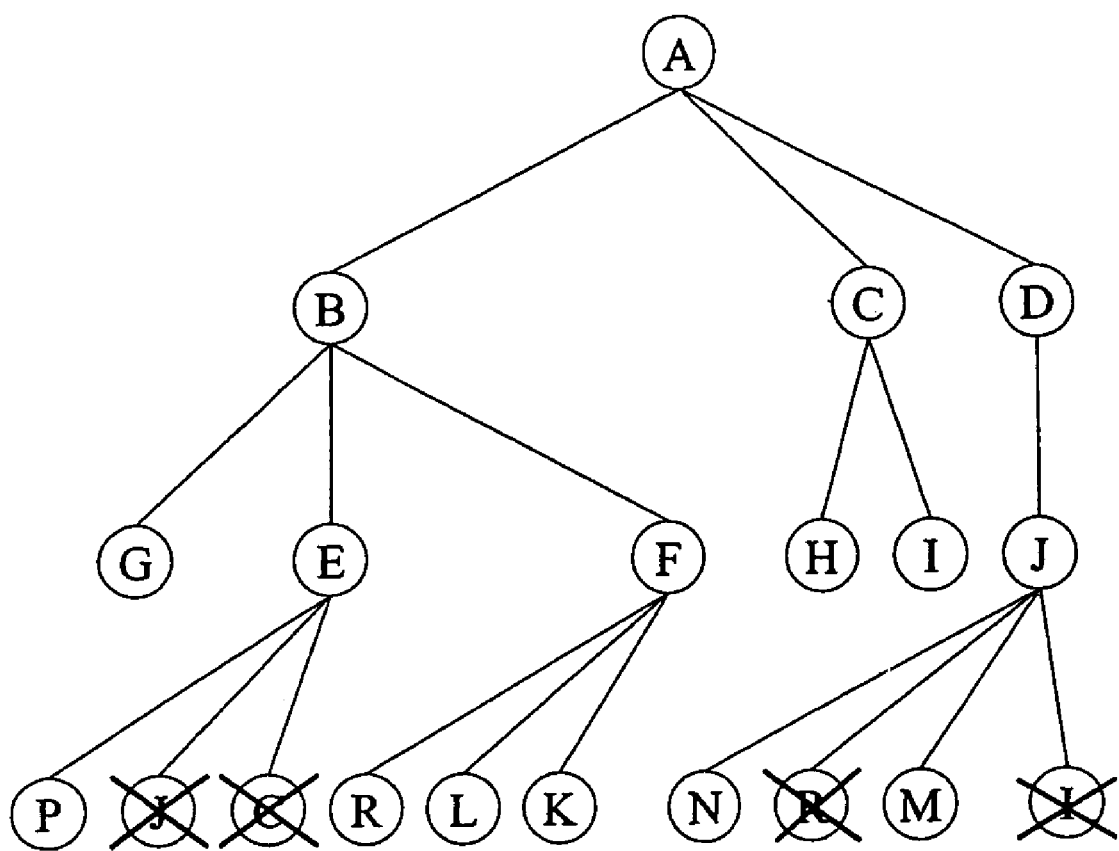
FIG. 22 is a tree diagram.

In the tree fragment shown in FIG. 22, below J the nodes N and R have the owner C and M has the owner E which already appear in the second and third level. Here C appears before E. Therefore N and R move to the first place before M, and in fact N appears before R according to its priority.

Figure 23:
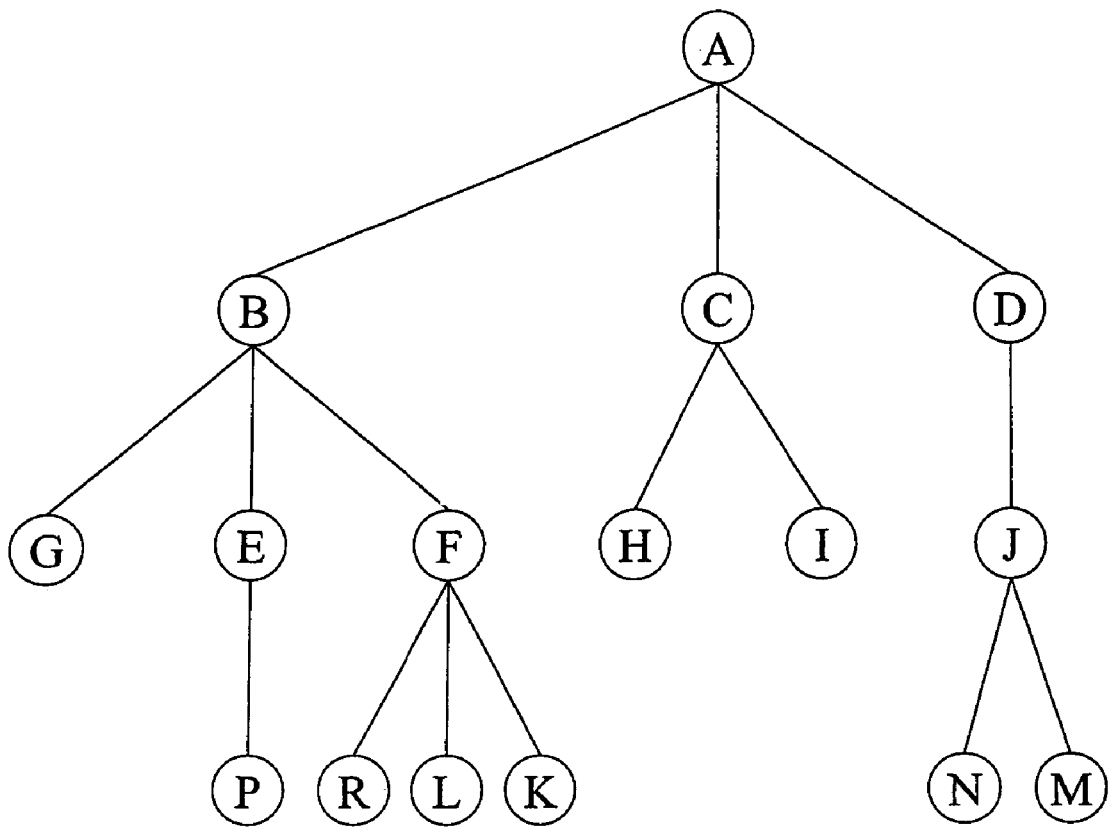
FIG. 23 is a tree diagram.
Figure 24:
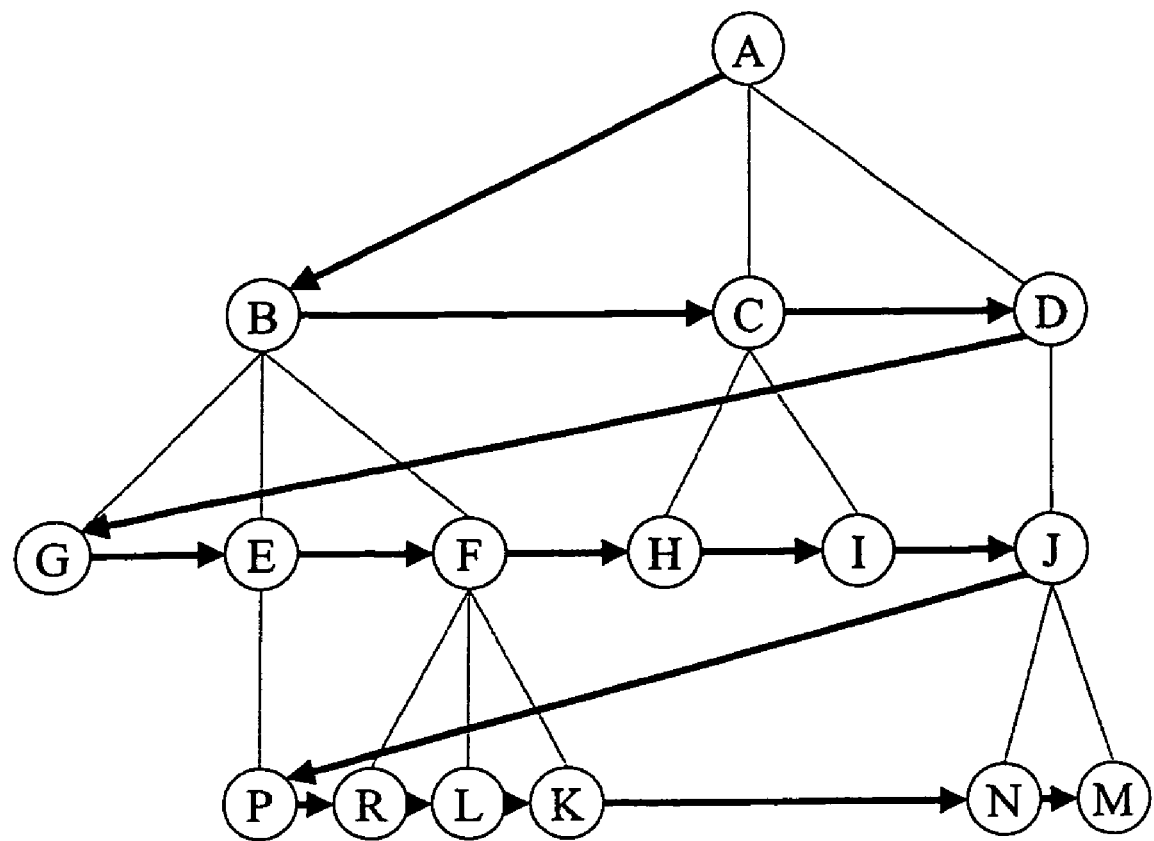
FIG. 24 is a tree diagram.

Since J, C, and I are already present in the second and third level, they are deleted in the fourth level. The second occurrence of R will also be deleted. Thus the resulting tree is shown in FIG. 23. The order of traversal is shown in FIG. 24 and we get mapping rules as follows:

$R_i(A,A)=(A,B)$
$R_i(A,B)=(A,C)$
$R_i(A,C)=(A,D)$
$R_i(A,D)=(A,G)$
$R_i(A,G)=(A,E)$
$R_i(A,E)=(A,F)$
$R_i(A,F)=(A,H)$
$R_i(A,H)=(A,I)$
$R_i(A,I)=(A,J)$
$R_i(A,J)=(A,P)$
$R_i(A,P)=(A,R)$
$R_i(A,R)=(A,L)$
$R_i(A,L)=(A,K)$
$R_i(A,K)=(A,N)$
$R_i(A,N)=(A,M)$

Figure 25:
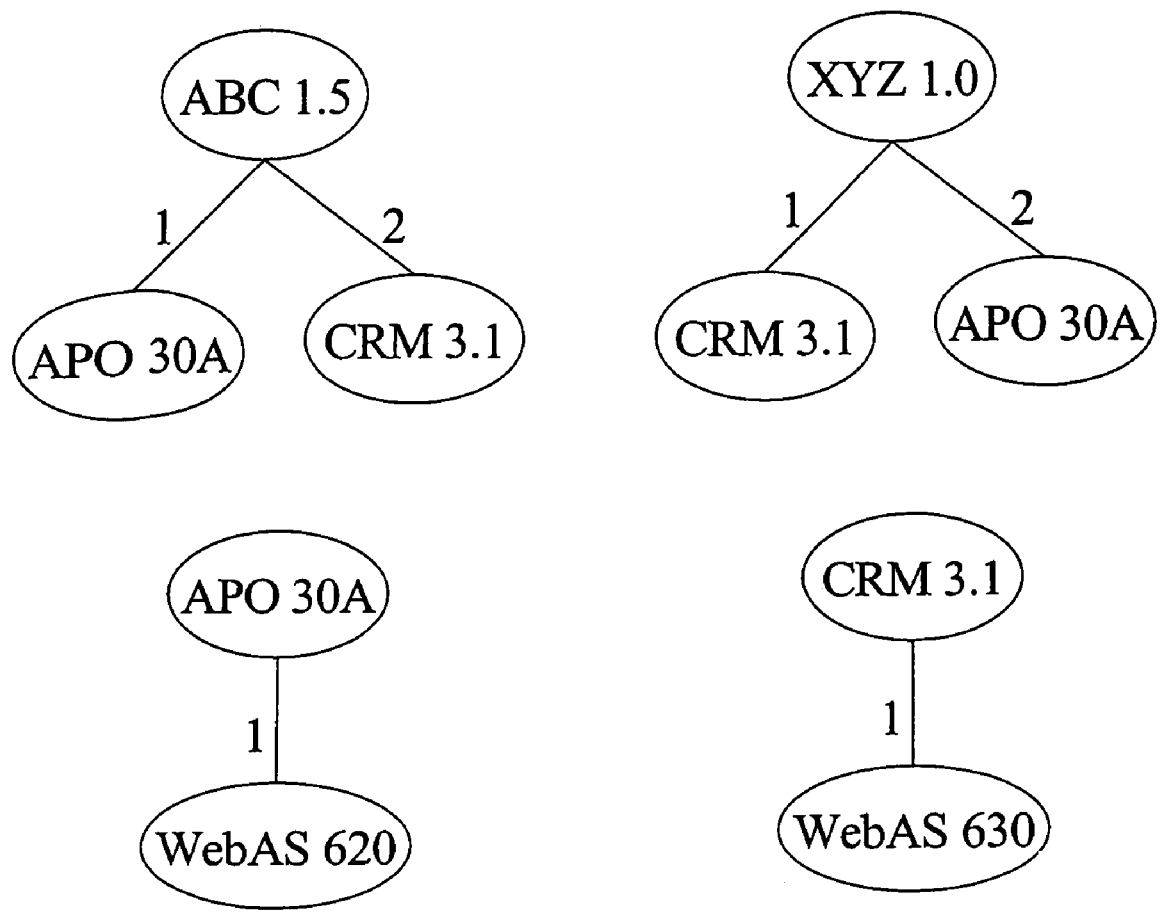
FIG. 25 is a tree diagram.
Figure 26:
FIG. 26 is a tree diagram.
Figure 26:
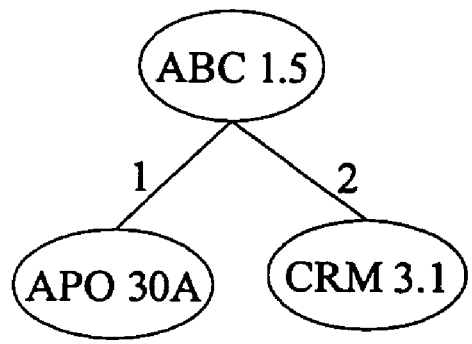
Figure 26:
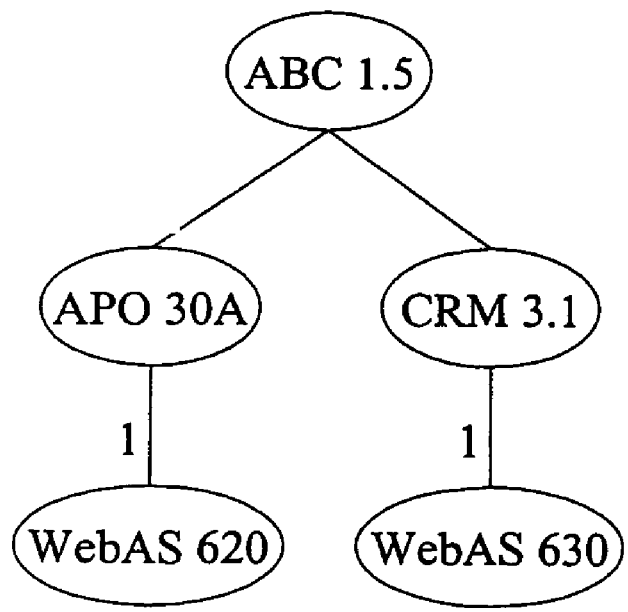
Figure 27:
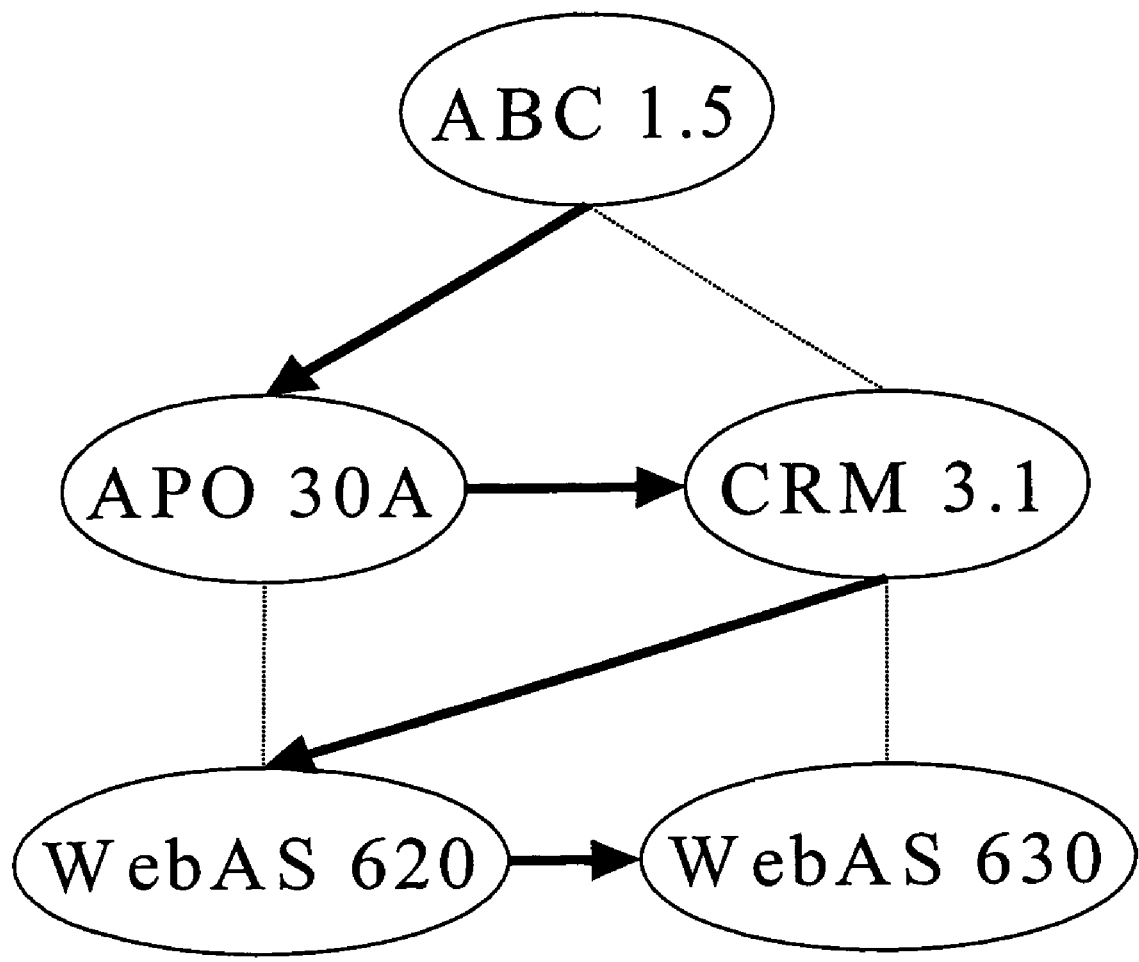
FIG. 27 is a tree diagram.

For all other pairs (A,•) the map $R_i$ is undefined. Implementation of the example shown in FIG. 8 is shown in FIG. 25. For the entry context ABC 1.5, the sequence of contexts when COMPONENT is changed is derived as shown in FIG. 26. The order of traversal is shown in FIG. 27. Hence for the entry context ABC 1.5 we get the sequence of contexts ABC 1.5→APO 30A→CRM 3.1→WebAS 620→WebAS 630, when COMPONENT is changed.

Figure 28:
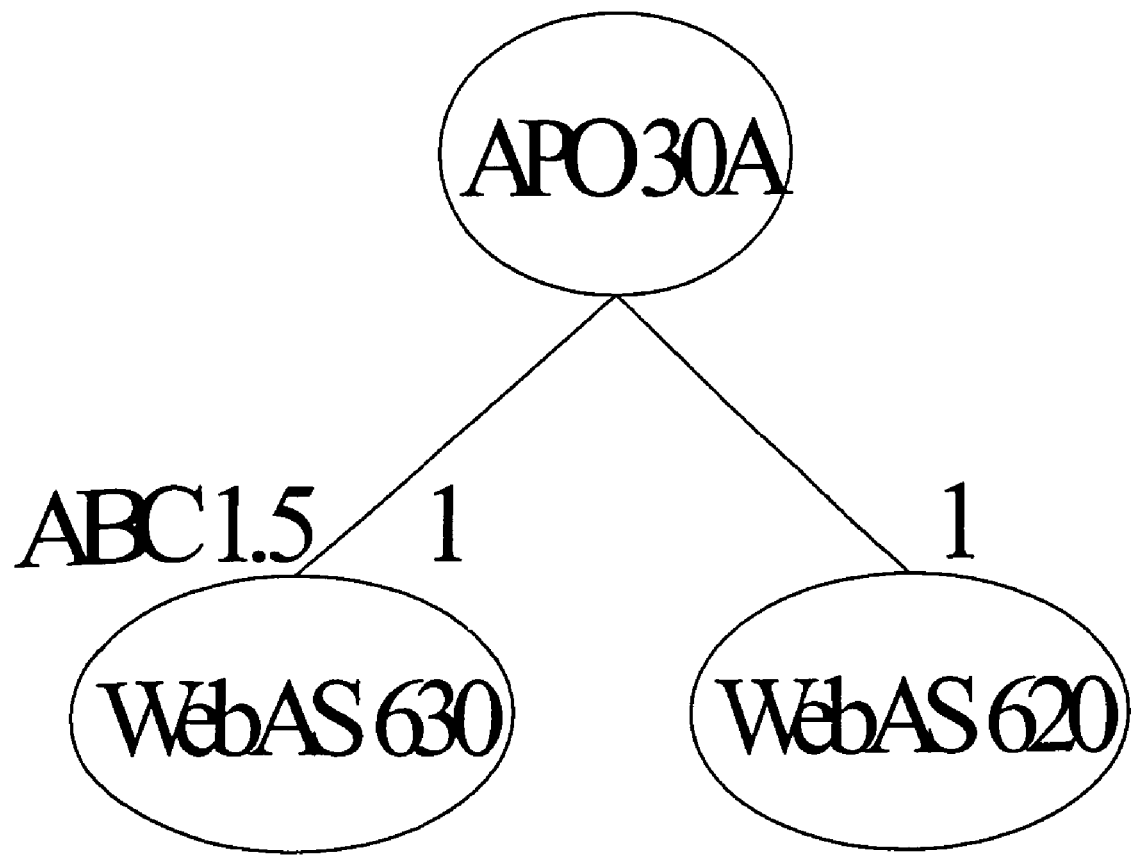
FIG. 28 is a tree diagram.

We described above that the change of COMPONENT should not be used to change only RELEASE since there is a separate map for this purpose. In the present case this cannot be avoided since we cannot remove the COMPONENT WebAS 620 of APO 30A without disturbing the context chain for the entry context APO 30A. But the order of the WebAS contexts can easily be changed through the use of owners. This is shown in the tree fragment in FIG. 28.

Figure 29:
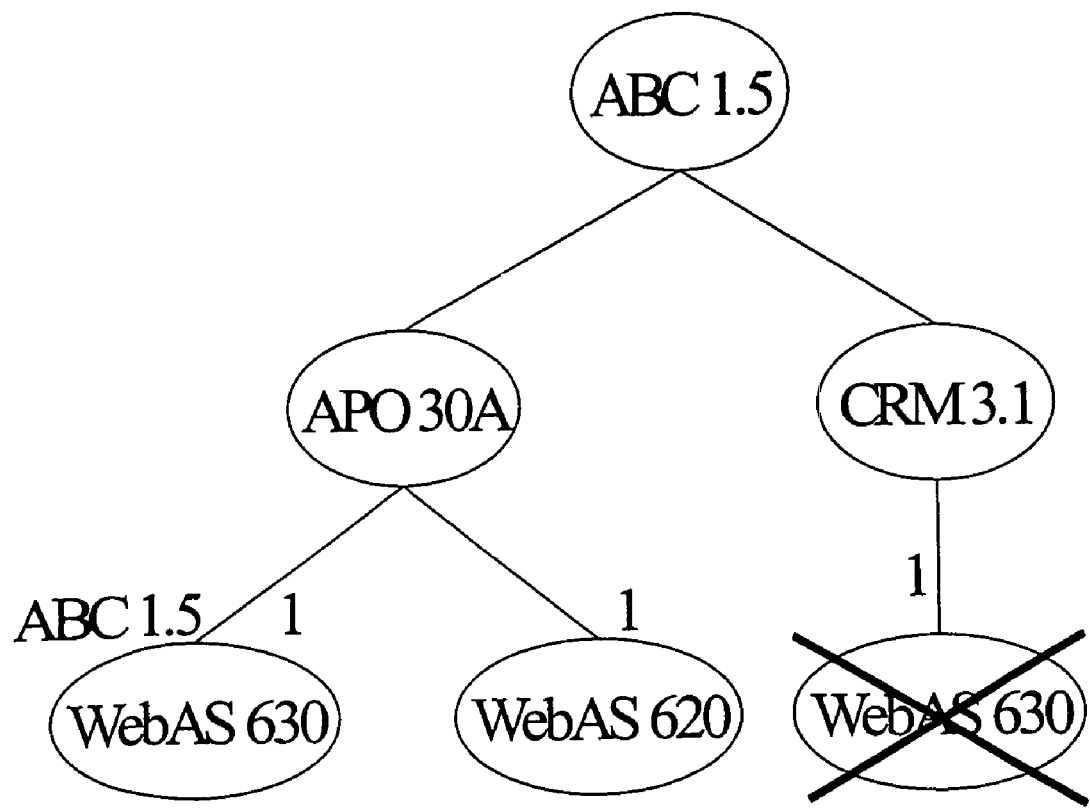
FIG. 29 is a tree diagram.

This change does not disturb the context chain for the entry context APO 30A since the first node has the owner ABC 1.5, which does not occur in this context chain. But level 3 above reads as shown in FIG. 29. The last node is deleted since its content already occurred previously. From this results the following sequence of changes for COMPONENT for the entry context ABC 1.5

ABC 1.5→APO 30→CRM 3.1→WebAS 630→WebAS 620.

Figure 30:
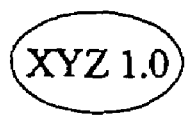
FIG. 30 is a tree diagram.
Figure 30:
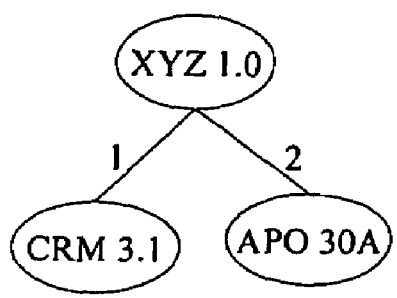
Figure 30:
Figure 30:
Figure 30:
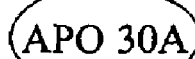
Figure 30:
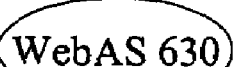
Figure 30:
Figure 30:
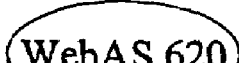

For the entry context XYZ 1.0, the sequence of contexts when COMPONENT is changed is derived as shown in FIG. 30. The second to the last node is deleted since its owner does not occur. From this results the following sequence of changes for COMPONENT for the entry context XYZ 1.0

XYZ 1.0→CRM 3.1→APO 30A→WebAS 630→WebAS 620.

Figure 31:
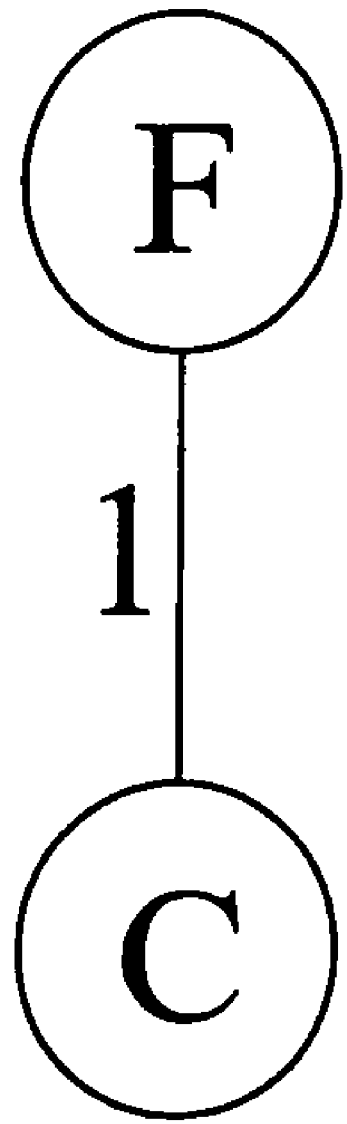
FIG. 31 is a tree diagram.

Simple context resolution is a special case of the extended context resolution. Contents of SAP KW that are organized according to the simple context resolution can be adopted unchanged provided the extended context resolution is suitably configured. To this end we define for each one-argument map $R_i$ that is used in the simple context resolution a two-argument map for the extended context resolution by specifying tree fragments as follows: As shown in FIG. 31, for every context F∈K of the range of definition of $R_i$ a tree fragment is generated, where C is the image of F under $R_i$. The priority is set to 1 and no owner is specified.

For an implementation of context resolution some further issues are considered besides the knowledge from the models. For instance, we must decide how the entry context is determined and how certain maps are maintained appropriately. Besides the actual context resolution as described above, there will also be other modules that are necessary for a specific implementation. These modules precede the actual context resolution.

In general, a design of context resolution includes generation of definitions. For example, attributes are defined. We determine which attributes shall be taken into account during context resolution. Each PHIO has these attributes. Thus, it is known how many attributes exist and which technical properties the values each of the attributes have.

Dependencies are defined. We determine which attributes are interdependent. Each group of interdependent attributes can contain at most two members. In the example described above, the pair COMPONENT and RELEASE are used as examples of interdependent attributes. In another example, a comparable interdependency is generated between LANGUAGE and COUNTRY.

Maps are defined. We determine which maps are used. For each map we define which attribute(s) it refers and its type. We define as many maps as there are attributes. In particular, the peculiarities of interdependent attributes are respected.

The maps' storage is defined. We determine in what form the maps shall be stored, i.e. which data structures are needed. With tree fragments, arbitrary assignments of attribute values can be represented. In practice, three types of storage occur. Here only the changing attributes are stored, i.e. we always consider the map $K_i$ belonging to $R_i$.

In a simple context resolution, given a map $R_i$: K→K resp. $K_i$: $A_x→A_x$ or $K_i$: $A_x×A_y→A_x×A_y$, it is sufficient to store the assigned attribute values in a table:

| | |
|---|---|
| $a_x' = K_i(a_x)$ | leads to the table entry $(a_x, a_x')$ |
| $(a_x', a_y') = K_i(a_x, a_y)$ | leads to the table entry $((a_x, a_y), (a_x', a_y'))$ |

Figure 32:
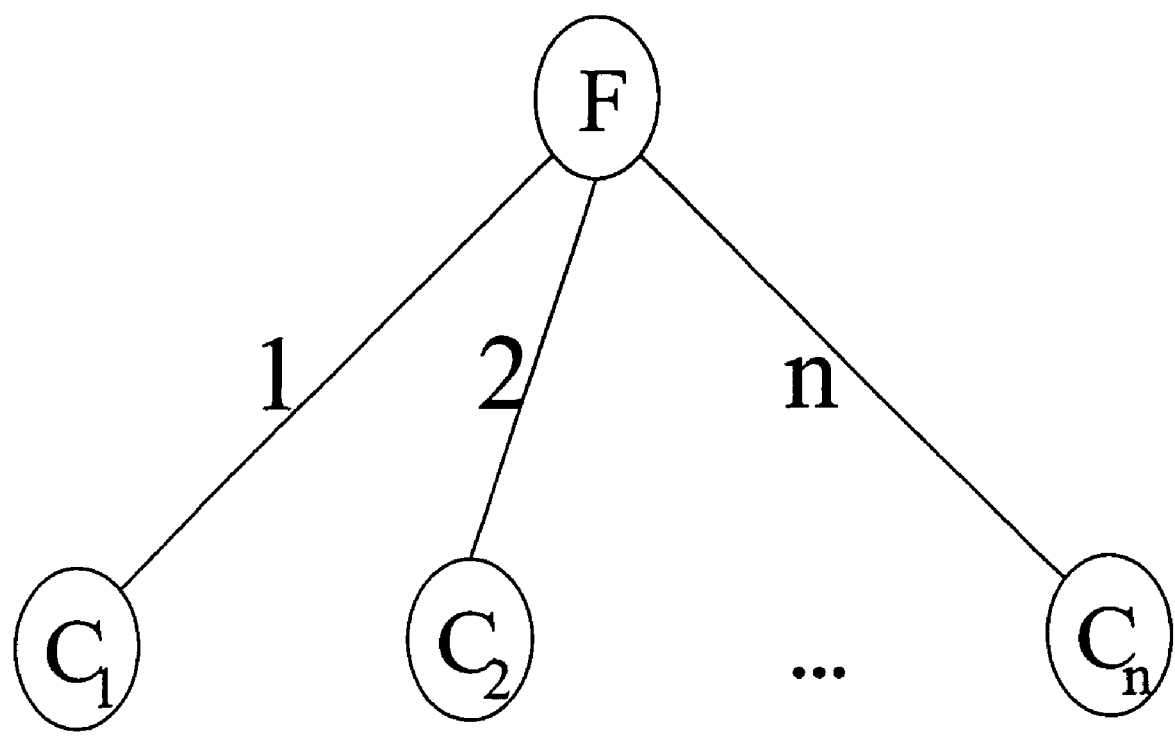
FIG. 32 is a tree diagram.

In an extended context resolution, given a map $R_i$: K×K→K resp. $K_i$: K×$A_x$→$A_x$ or $K_i$: K×$A_x$×$A_y$→$A_x$×$A_y$ and no owners allowed, then the tree fragment shown in FIG. 32 and is represented by the following table entries:

| |
|---|
| (F, 1, $C_1$) |
| (F, 2, $C_2$) |
| ... |
| (F, n, $C_n$) |

Figure 33:
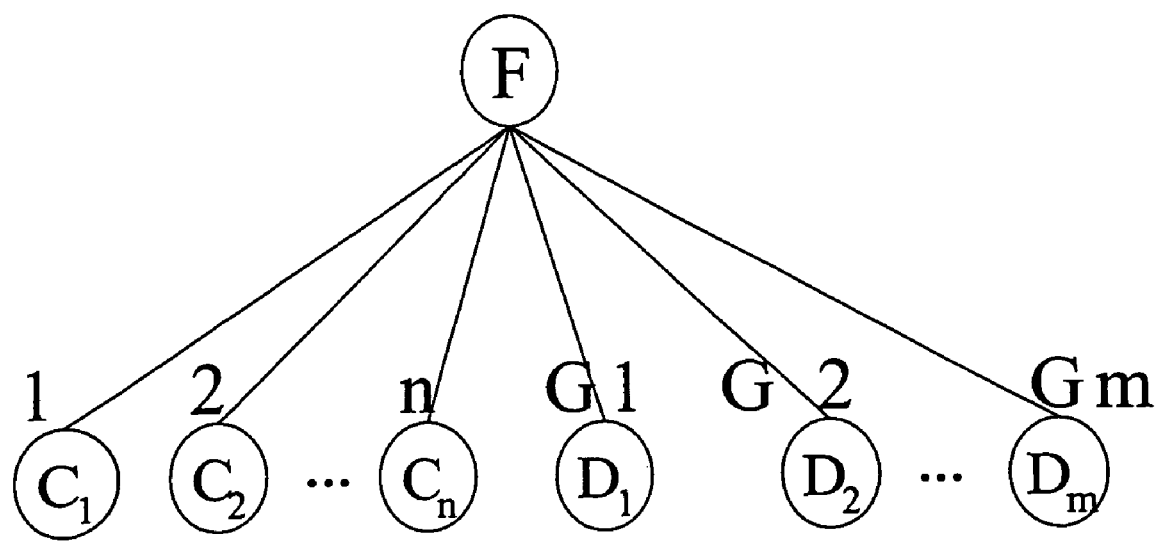
FIG. 33 is a tree diagram.

Here F and $C_i$ each are attribute values from $A_x$ or value pairs from $A_x×A_y$. In an extended context resolution, given a map $R_i$: K×K→K resp. $K_i$: K $A_x$→$A_x$ or $K_i$: K×$A_x$×$A_y$→$A_x$×$A_y$ and owners allowed, then the tree fragment shown in FIG. 33 is represented by the following table entries:

| |
|---|
| (F, 1, $C_1$, space) |
| (F, 2, $C_2$, space) |
| ... |
| (F, n, $C_n$, space) |
| (F, 1, $D_1$, G) |
| (F, 2, $D_2$, G) |
| ... |
| (F, m, $D_m$, G) |

Here F, $C_i$, $D_j$ and G each are attribute values from $A_x$ or value pairs from $A_x×A_y$.

It should be pointed out that the table entries described above have different semantics depending on whether the simple or the extended context resolution is used. With the simple context resolution the table entries directly represent the transitions between attribute values, in the case of the extended context resolution they are the basis for an algorithm that computes these transitions depending on the entry context. The decision about the kind of storage is essential inasmuch at a later point in time it cannot be changed without further problems.

Attribute values are defined. We determine which attribute values are admissible. As a rule, a range of values are considered rather than arbitrary values for an attribute. This does not exclude the possibility that this range is extended in a specific way as time passes. For such limited value ranges adequate technical prerequisites are generated. Furthermore, we determine whether we should only work with values when storing the maps. Although a map always describes assignments between values of attributes, for the definition of such assignments the use of variables can be useful.

A variable is a representative for a value that is determined before the actual context resolution is called. Through a variable it is possible to collect a multitude of assignments in the definition of a map into a single assignment or to state a single assignment which depends on the system or the LOIO, as is described below.

With the arrangements described here only the technical framework for a context resolution is determined. In particular, it is not determined in which order the maps are applied, which concrete values the attributes can take and how each particular map is defined. This is a matter of customizing.

The kind of map determines whether the model of the simple or of the extended context resolution is used. If at least one map is defined in terms of simple or complex tree fragments then the model of the extended context resolution is used.

Example variables include primary language, secondary language and master language for the attribute LANGUAGE. Here the value for primary language is determined by the logon language, the value for secondary language is determined by a system setting and the value for master language by the LOIO.

By assigning Primary language to English we make sure that always first the logon language and then English is used. Here with one single assignment a multitude of assignments (one for each possible logon language) is defined.

By assigning Primary language to Secondary language we make sure that after the logon language the secondary language is used as set in the system. Here with one single assignment we carry out a system wide setting.

By assigning English to master language we make sure that after English the master language of the LOIO is used. Here with one single assignment we carry out a setting that can be different for each LOIO. Such an assignment would not at all be possible without the use of variables.

An entry context is given for each access to a LOIO. During implementation of context resolution we also determine the entry context. For example, a calling program can completely determine the entry context by itself. But this makes only sense in special cases, e.g. for a tool for the maintenance of the PHIOs. Normally the calling program only knows the reference to the corresponding LOIO and before the call to the context resolution the entry context is determined by the system in which the program runs.

Based on the entry context, some further preparations are necessary to start the context resolution, i.e. to compute the context chain. The problem is to determine the concrete value assignment of each wheel.

If a map is given in the form of tree fragments we must run the algorithm for determining the actual sequence of values. If a map is given in the form of assignments it could make sense to predetermine the sequence of attribute values that is recursively defined starting with the entry context. If the definition of a map contains variables these must be replaced by values. For this several different procedures are conceivable. Often system variables are used here. For instance, for the variable primary language the value of the system variable login language is used.

It should be noted that with the use of variables sequences of values might arise in which a value occurs multiply (e.g. if primary language and master language are both English). In these cases the double entries should be deleted to avoid unnecessary checks.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims.

What is claimed is:

1. A method comprising:
   maintaining two or more variants of a document, the content of each of the two or more variants of the document being contained in a respective one of two or more physical information objects (PHIOs), each context being defined by a tuplet of n attribute values for n attributes, where n>1;
   storing a set of m maps $R_i$, $1 \leq i \leq m$, where:
      m, the number of maps, is at least as large as n, the number of attributes,
      each map $R_i$ defines a mapping from the set of all possible contexts to the set of all possible contexts, each context being defined by a tuplet of n attribute values for the n attributes,
      each map $R_i$ is undefined for at least one context in the set of all possible contexts, whereby each map $R_i$ is recursion free, and
      the maps have an order from $R_1$ through $R_m$;
   receiving an entry context and a request for the document, the entry context being defined by a tuplet of n attribute values for the n attributes;
   defining a sequence of contexts that begins with the entry context from the set of m maps, each successive context in the sequence of contexts being derived from the preceding context in the sequence of contexts by application of one of the maps, the applied map in each derivation being the first of the maps that is not defined for the proceeding context in the sequence of contexts;
   selecting a PHIO having a context that occurs in the sequence of contexts before the contexts of any other of the two or more PHIOs; and
   providing the selected PHIO in response to the request for the document.

2. The method of claim 1 wherein the request is through a hyperlink.

3. The method of claim 1 wherein the attributes include one or more of a name of a component, a version of the component, a language or a country.

4. The method of claim 1 wherein the application of one of the maps to an input context produces a corresponding output context by changing a single attribute value or a pair of attribute values of the input context, the map providing a dimension in which neighboring relations with respect to an attribute or a combination of attributes are defined.

5. A computer program product, tangibly embodied in a machine-readable storage device, the computer program product being operable to cause data processing apparatus to:
   maintain two or more variants of a document, the content of each of the two or more variants of the document being contained in a respective one of two or more physical information objects (PHIOs), each context being defined by a tuplet of n attribute values for n attributes, where n>1;
   store a set of m maps $R_i$, $1 \leq i \leq m$ where:
      m, the number of maps, is at least as large as n, the number of attributes,
      each map $R_i$ defines a mapping from the set of all possible contexts to the set of all possible contexts, each context being defined by a tuplet of n attribute values for the n attributes,
      each map $R_i$ is undefined for at least one context in the set of all possible contexts, whereby each map $R_i$ is recursion free, and
      the maps have an order from $R_1$ through $R_m$;
   receive an entry context and a request for the document, the entry context being defined by a tuplet of n attribute values for the n attributes;
   define a sequence of contexts that begins with the entry context from the set of m maps, each successive context in the sequence of contexts being derived from the preceding context in the sequence of contexts by application of one of the maps, the applied map in each derivation being the first of the maps that is not defined for the proceeding context in the sequence of contexts;
   select a PHIO having a context that occurs in the sequence of contexts before the contexts of any other of the two or more PHIOs; and
   provide the selected PHIO in response to the request for the document.

6. The computer product of claim 5 wherein the request is through a hyperlink.

7. The computer product of claim 5 wherein the application of one of the maps to an input context produces a corresponding output context by changing a single attribute value or a pair of attribute values of the input context, the map providing a dimension in which neighboring relations with respect to an attribute or a combination of attributes are defined.

8. A system for maintaining a database, the system comprising:
   means for maintaining two or more variants of a document, the content of each of the two or more variants of the document being contained in a respective one of two or more physical information objects (PHIOs), each context being defined by a tuplet of n attribute values for n attributes, where n>1;

means for storing a set of m maps $R_i$, $1 \leq i \leq m$, where:
  m, the number of maps, is at least as large as n, the number of attributes,
  each map $R_i$ defines a mapping from the set of all possible contexts to the set of all possible contexts, each context being defined by a tuplet of n attribute values for the n attributes,
  each map $R_i$ is undefined for at least one context in the set of all possible contexts, whereby each map $R_i$ is recursion free, and
  the maps have an order from $R_1$ through $R_m$;

means for receiving an entry context and a request for the document, the entry context being defined by a tuplet of n attribute values for the n attributes;

means for defining a sequence of contexts that begins with the entry context from the set of m maps, each successive context in the sequence of contexts being derived from the preceding context in the sequence of contexts by application of one of the maps, the applied map in each derivation being the first of the maps that is not defined for the proceeding context in the sequence of contexts;

means for selecting a PHIO having a context that occurs in the sequence of contexts before the contexts of any other of the two or more PHIOs; and means for providing the selected PHIO in response to the request for the document.

9. The system of claim 8 wherein the request is through a hyperlink.

10. The system of claim 8 wherein the attributes include one or more of a name of a component, a version of the component, a language or a country.

11. The system of claim 8 wherein the application of one of the maps to an input context produces a corresponding output context by a single attribute value or a pair of attribute values of the input context, the map providing a dimension in which neighboring relations with respect to an attribute or a combination of attributes are defined.

* * * * *